(12) United States Patent
Asai et al.

(10) Patent No.: US 9,253,762 B2
(45) Date of Patent: Feb. 2, 2016

(54) WIRELESS COMMUNICATION SYSTEM AND ACCESS POINT APPARATUS

(75) Inventors: Yusuke Asai, Yokosuka (JP); Riichi Kudo, Yokosuka (JP); Takeo Ichikawa, Yokosuka (JP); Yasuhiko Inoue, Yokosuka (JP); Hirantha Sithira Abeysekera, Yokosuka (JP); Masato Mizoguchi, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 173 days.

(21) Appl. No.: 14/113,319

(22) PCT Filed: Apr. 25, 2012

(86) PCT No.: PCT/JP2012/061037
§ 371 (c)(1),
(2), (4) Date: Oct. 22, 2013

(87) PCT Pub. No.: WO2012/147768
PCT Pub. Date: Nov. 1, 2012

(65) Prior Publication Data
US 2014/0050178 A1    Feb. 20, 2014

(30) Foreign Application Priority Data
Apr. 27, 2011  (JP) .................................. 2011-100143

(51) Int. Cl.
*H04W 72/04*  (2009.01)
*H04W 24/02*  (2009.01)
(Continued)

(52) U.S. Cl.
CPC ............. *H04W 72/04* (2013.01); *H04B 7/0452* (2013.01); *H04L 1/00* (2013.01); *H04L 12/18* (2013.01);
(Continued)

(58) Field of Classification Search
None
See application file for complete search history.

(56) References Cited

U.S. PATENT DOCUMENTS 6,018,771 A * 1/2000 Hayden .......................... 709/231
6,078,954 A * 6/2000 Lakey et al. .................. 709/223
(Continued)

FOREIGN PATENT DOCUMENTS

| JP | A-10-093555 | 4/1998 |
| JP | A-11-239150 | 8/1999 |

(Continued)

OTHER PUBLICATIONS

Q. H. Spencer, C. B. Peel, A. L. Swindlehurst, and M. Haardt, "An introduction to the multi-user MIMO downlink", IEEE Comm. Magazine, Oct. 2004, pp. 60-67.
(Continued)

*Primary Examiner* — Gary Mui
(74) *Attorney, Agent, or Firm* — Harness, Dickey & Pierce, P.L.C.

(57) ABSTRACT

In a system which performs wireless communication from an access point to stations using group identification information, the frequency of uses of group identification information that overlaps with that of another access point is reduced. An association between a station apparatus included in a group that is a target for simultaneous transmission and group identification information is stored, each station apparatus included in the group is notified of the group identification information, group identification information that is being used in the other access point apparatus is acquired, and if group identification information that is being used by the access point apparatus itself overlaps with the group identification information used by the other access point apparatus, the group identification information is changed so as to reduce the number of pieces of overlapping group identification information.

14 Claims, 16 Drawing Sheets

| GROUP ID | MEMBER 1 | MEMBER 2 | MEMBER 3 | MEMBER 4 |
|---|---|---|---|---|
| 0 | (IN USE IN ADJACENT CELL) | | | |
| 1 | (IN USE IN ADJACENT CELL) | | | |
| 2 | STATION-B | STATION-D | – | – |
| 3 | STATION-C | STATION-E | – | – |
| 4 | STATION-D | STATION-E | – | – |
| 5 | STATION-A | STATION-B | STATION-C | STATION-D |
| 6 | STATION-A | STATION-C | STATION-D | – |
| 7 | (SINGLE USER MIMO TRANSMISSION) | | | |

(51) Int. Cl.

| | | |
|---|---|---|
| *H04L 29/12* | (2006.01) | |
| *H04W 8/18* | (2009.01) | |
| *H04L 1/00* | (2006.01) | |
| *H04L 12/18* | (2006.01) | |
| *H04W 52/00* | (2009.01) | |
| *H04W 76/00* | (2009.01) | |
| *H04B 7/04* | (2006.01) | |
| *H04W 88/08* | (2009.01) | |
| *H04W 76/02* | (2009.01) | |

(52) U.S. Cl.
CPC .......... *H04L 12/185* (2013.01); *H04L 61/2046* (2013.01); *H04L 61/2069* (2013.01); *H04W 8/186* (2013.01); *H04W 24/02* (2013.01); *H04W 52/00* (2013.01); *H04W 76/002* (2013.01); *H04W 76/021* (2013.01); *H04W 88/08* (2013.01)

(56) References Cited

U.S. PATENT DOCUMENTS

| | | | |
|---|---|---|---|
| 2006/0164969 A1 | 7/2006 | Malik et al. | |
| 2007/0291770 A1* | 12/2007 | Kitazoe | 370/395.52 |
| 2007/0293229 A1* | 12/2007 | Khan | 455/450 |
| 2008/0170538 A1* | 7/2008 | Duggi et al. | 370/328 |
| 2009/0003352 A1* | 1/2009 | Gutknecht et al. | 370/395.32 |
| 2009/0129291 A1* | 5/2009 | Gupta et al. | 370/254 |
| 2009/0170488 A1* | 7/2009 | Becker et al. | 455/416 |
| 2009/0238356 A1* | 9/2009 | Kojo et al. | 379/206.01 |
| 2010/0081454 A1 | 4/2010 | Wang et al. | |
| 2010/0273512 A1* | 10/2010 | Wang et al. | 455/458 |
| 2011/0002219 A1 | 1/2011 | Kim et al. | |
| 2011/0013592 A1* | 1/2011 | Uemura et al. | 370/331 |
| 2011/0064040 A1 | 3/2011 | Kim et al. | |
| 2013/0012214 A1* | 1/2013 | Shinke et al. | 455/446 |
| 2014/0080475 A1* | 3/2014 | Gholmieh et al. | 455/422.1 |

FOREIGN PATENT DOCUMENTS

| | | |
|---|---|---|
| JP | A-11-275106 | 10/1999 |
| JP | A-2003-032262 | 1/2003 |

OTHER PUBLICATIONS

J. Kim, et al., "GroupID Concept for Downlink MU-MIMO Transmission," doc.:IEEE 802.11-10/0073r2. https://mentor.ieee.org/802.11/dcn/10/11-10-0073-02-00ac-group-id-concept-for-dl-mu-mimo.ppt.

International Search Report for PCT/JP2012/061037, ISA/JP, mailed Jul. 24, 2012.

Search Report, European Patent Application No. 12776532.9, Jul. 18, 2014.

* cited by examiner

FIG. 4

| GROUP ID | MEMBER 1 | MEMBER 2 | MEMBER 3 | MEMBER 4 |
|---|---|---|---|---|
| 0 (261Mbps) | STATION-A (200Mbps) | STATION-B (50Mbps) | STATION-C (10Mbps) | STATION-D (1Mbps) |
| 1 (211Mbps) | STATION-A (200Mbps) | STATION-C (10Mbps) | STATION-D (1Mbps) | - |
| 2 (51Mbps) | STATION-B (50Mbps) | STATION-D (1Mbps) | - | - |
| 3 (10.1Mbps) | STATION-C (10Mbps) | STATION-E (0.1Mbps) | - | - |
| 4 (1.1Mbps) | STATION-D (1Mbps) | STATION-E (0.1Mbps) | - | - |
| 5 | NOT SET | | | |
| 6 | NOT SET | | | |
| 7 | (INDICATION OF SINGLE USER) | | | |

FIG. 5

| GROUP ID | USE STATE |
|---|---|
| 0 | IN USE |
| 1 | IN USE |
| 2 | IN USE |
| 3 | USE HAS NOT BEEN DETECTED |
| 4 | USE HAS NOT BEEN DETECTED |
| 5 | USE HAS NOT BEEN DETECTED |
| 6 | USE HAS NOT BEEN DETECTED |
| 7 | (INDICATION OF SINGLE USER) |

FIG. 6

| GROUP ID | MEMBER 1 | MEMBER 2 | MEMBER 3 | MEMBER 4 |
|---|---|---|---|---|
| 0 | (NOT ALLOCATED) | | | |
| 1 | (NOT ALLOCATED) | | | |
| 2 (51Mbps) | STATION-B (50Mbps) | STATION-D (1Mbps) | – | – |
| 3 (10.1Mbps) | STATION-C (10Mbps) | STATION-E (0.1Mbps) | – | – |
| 4 (1.1Mbps) | STATION-D (1Mbps) | STATION-E (0.1Mbps) | – | – |
| 5 (261Mbps) | STATION-A (200Mbps) | STATION-B (50Mbps) | STATION-C (10Mbps) | STATION-D (1Mbps) |
| 6 (211Mbps) | STATION-A (200Mbps) | STATION-C (10Mbps) | STATION-D (1Mbps) | – |
| 7 | (INDICATION OF SINGLE USER) | | | |

FIG. 7

| GROUP ID (THROUGHPUT) | MEMBER 1 | MEMBER 2 | MEMBER 3 | MEMBER 4 |
|---|---|---|---|---|
| 0 | (NOT ALLOCATED BUT IN USE IN ADJACENT ACCESS POINT) | | | |
| 1 | (NOT ALLOCATED BUT IN USE IN ADJACENT ACCESS POINT) | | | |
| 2 (1.1Mbps) | STATION-D (1Mbps) | STATION-E (0.1Mbps) | – | – |
| 3 (10.1Mbps) | STATION-C (10Mbps) | STATION-E (0.1Mbps) | – | – |
| 4 (51Mbps) | STATION-B (50Mbps) | STATION-D (1Mbps) | – | – |
| 5 (261Mbps) | STATION-A (200Mbps) | STATION-B (50Mbps) | STATION-C (10Mbps) | STATION-D (1Mbps) |
| 6 (211Mbps) | STATION-A (200Mbps) | STATION-C (10Mbps) | STATION-D (1Mbps) | – |
| 7 | (INDICATION OF SINGLE USER) | | | |

FIG. 8

| GROUP ID | USE STATE |
|---|---|
| 0 (10Mbps) | IN USE |
| 1 (0.1Mbps) | IN USE |
| 2 (45Mbps) | IN USE |
| 3 | USE HAS NOT BEEN DETECTED |
| 4 | USE HAS NOT BEEN DETECTED |
| 5 | USE HAS NOT BEEN DETECTED |
| 6 | USE HAS NOT BEEN DETECTED |
| 7 | (INDICATION OF SINGLE USER) |

FIG. 9

| GROUP ID (THROUGHPUT) | MEMBER 1 | MEMBER 2 | MEMBER 3 | MEMBER 4 |
|---|---|---|---|---|
| 0 | (NOT ALLOCATED BUT IN USE IN ADJACENT ACCESS POINT) | | | |
| 1 (1.1Mbps) | STATION-D (1Mbps) | STATION-E (0.1Mbps) | – | – |
| 2 | (NOT ALLOCATED BUT IN USE IN ADJACENT ACCESS POINT) | | | |
| 3 (10.1Mbps) | STATION-C (10Mbps) | STATION-E (0.1Mbps) | – | – |
| 4 (51Mbps) | STATION-B (50Mbps) | STATION-D (1Mbps) | – | – |
| 5 (261Mbps) | STATION-A (200Mbps) | STATION-B (50Mbps) | STATION-C (10Mbps) | STATION-D (1Mbps) |
| 6 (211Mbps) | STATION-A (200Mbps) | STATION-C (10Mbps) | STATION-D (1Mbps) | – |
| 7 | (INDICATION OF SINGLE USER) | | | |

FIG. 10

| GROUP ID (NUMBER OF TRANSMISSIONS) | MEMBER 1 | MEMBER 2 | MEMBER 3 | MEMBER 4 |
|---|---|---|---|---|
| 0 (1000 TIMES) | STATION-A | STATION-B | STATION-C | STATION-D |
| 1 (50 TIMES) | STATION-A | STATION-C | STATION-D | – |
| 2 (200 TIMES) | STATION-B | STATION-D | – | – |
| 3 (100 TIMES) | STATION-C | STATION-E | – | – |
| 4 (2 TIMES) | STATION-D | STATION-E | – | – |
| 5 | NOT SET ||||
| 6 | NOT SET ||||
| 7 | (INDICATION OF SINGLE USER) ||||

FIG. 11

| GROUP ID | USE STATE |
|---|---|
| 0 | IN USE |
| 1 | IN USE |
| 2 | IN USE |
| 3 | IN USE |
| 4 | USE HAS NOT BEEN DETECTED |
| 5 | USE HAS NOT BEEN DETECTED |
| 6 | USE HAS NOT BEEN DETECTED |
| 7 | (INDICATION OF SINGLE USER) |

FIG. 12

| GROUP ID (NUMBER OF TRANSMISSIONS) | MEMBER 1 | MEMBER 2 | MEMBER 3 | MEMBER 4 |
|---|---|---|---|---|
| 0 | (NOT ALLOCATED) | | | |
| 1 (50 TIMES) | STATION-A | STATION-C | STATION-D | – |
| 2 | (NOT ALLOCATED) | | | |
| 3 (100 TIMES) | STATION-C | STATION-E | – | – |
| 4 (2 TIMES) | STATION-D | STATION-E | – | – |
| 5 (1000 TIMES) | STATION-A | STATION-B | STATION-C | STATION-D |
| 6 (200 TIMES) | STATION-B | STATION-D | – | – |
| 7 | (INDICATION OF SINGLE USER) | | | |

FIG. 13

| GROUP ID (NUMBER OF TRANSMISSIONS) | MEMBER 1 | MEMBER 2 | MEMBER 3 | MEMBER 4 |
|---|---|---|---|---|
| 0 | (NOT ALLOCATED BUT IN USE IN ADJACENT ACCESS POINT) | | | |
| 1 (50 TIMES) | STATION-A | STATION-C | STATION-D | – |
| 2 | (NOT ALLOCATED BUT IN USE IN ADJACENT ACCESS POINT) | | | |
| 3 (2 TIMES) | STATION-D | STATION-E | – | – |
| 4 (100 TIMES) | STATION-C | STATION-E | – | – |
| 5 (1000 TIMES) | STATION-A | STATION-B | STATION-C | STATION-D |
| 6 (200 TIMES) | STATION-B | STATION-D | – | – |
| 7 | (INDICATION OF SINGLE USER) | | | |

FIG. 14

| GROUP ID | USE STATE |
|---|---|
| 0 (10 TIMES) | IN USE |
| 1 (100 TIMES) | IN USE |
| 2 (3 TIMES) | IN USE |
| 3 (1000 TIMES) | IN USE |
| 4 | USE HAS NOT BEEN DETECTED |
| 5 | USE HAS NOT BEEN DETECTED |
| 6 | USE HAS NOT BEEN DETECTED |
| 7 | (INDICATION OF SINGLE USER) |

FIG. 15

| GROUP ID (NUMBER OF TRANSMISSIONS) | MEMBER 1 | MEMBER 2 | MEMBER 3 | MEMBER 4 |
|---|---|---|---|---|
| 0 (50 TIMES) | STATION-A | STATION-C | STATION-D | – |
| 1 | (NOT ALLOCATED BUT IN USE IN ADJACENT ACCESS POINT) | | | |
| 2 (2 TIMES) | STATION-D | STATION-E | – | – |
| 3 | (NOT ALLOCATED BUT IN USE IN ADJACENT ACCESS POINT) | | | |
| 4 (100 TIMES) | STATION-C | STATION-E | – | – |
| 5 (1000 TIMES) | STATION-A | STATION-B | STATION-C | STATION-D |
| 6 (200 TIMES) | STATION-B | STATION-D | – | – |
| 7 | (INDICATION OF SINGLE USER) | | | |

FIG. 16

| GROUP ID | MEMBER 1 | MEMBER 2 | MEMBER 3 | MEMBER 4 |
|---|---|---|---|---|
| 0 (BATTERY-POWERED STATIONS EXIST) | STATION-A (BATTERY-POWERED) | STATION-B (BATTERY-POWERED) | STATION-C | STATION-D |
| 1 (BATTERY-POWERED STATION EXISTS) | STATION-A (BATTERY-POWERED) | STATION-C | STATION-D | - |
| 2 (BATTERY-POWERED STATION EXISTS) | STATION-B (BATTERY-POWERED) | STATION-D | - | - |
| 3 (NO BATTERY-POWERED STATION EXISTS) | STATION-C | STATION-E | - | - |
| 4 (NO BATTERY-POWERED STATION EXISTS) | STATION-D | STATION-E | - | - |
| 5 | NOT SET | | | |
| 6 | NOT SET | | | |
| 7 | (INDICATION OF SINGLE USER) | | | |

FIG. 17

| GROUP ID | USE STATE |
|---|---|
| 0 | IN USE |
| 1 | IN USE |
| 2 | IN USE |
| 3 | IN USE |
| 4 | USE HAS NOT BEEN DETECTED |
| 5 | USE HAS NOT BEEN DETECTED |
| 6 | USE HAS NOT BEEN DETECTED |
| 7 | (INDICATION OF SINGLE USER) |

FIG. 18

| GROUP ID | MEMBER 1 | MEMBER 2 | MEMBER 3 | MEMBER 4 |
| --- | --- | --- | --- | --- |
| 0 | NOT ALLOCATED | | | |
| 1 | NOT ALLOCATED | | | |
| 2 (BATTERY-POWERED STATION EXISTS) | STATION-B (BATTERY-POWERED) | STATION-D | – | – |
| 3 (NO BATTERY-POWERED STATION EXISTS) | STATION-C | STATION-E | – | – |
| 4 (NO BATTERY-POWERED STATION EXISTS) | STATION-D | STATION-E | – | – |
| 5 (BATTERY-POWERED STATIONS EXIST) | STATION-A (BATTERY-POWERED) | STATION-B (BATTERY-POWERED) | STATION-C | STATION-D |
| 6 (BATTERY-POWERED STATION EXISTS) | STATION-A (BATTERY-POWERED) | STATION-C | STATION-D | – |
| 7 | (INDICATION OF SINGLE USER) | | | |

FIG. 19

| GROUP ID | MEMBER 1 | MEMBER 2 | MEMBER 3 | MEMBER 4 |
| --- | --- | --- | --- | --- |
| 0 | NOT ALLOCATED | | | |
| 1 | NOT ALLOCATED | | | |
| 2 (NO BATTERY-POWERED STATION EXISTS) | STATION-D | STATION-E | – | – |
| 3 (NO BATTERY-POWERED STATION EXISTS) | STATION-C | STATION-E | – | – |
| 4 (BATTERY-POWERED STATION EXISTS) | STATION-B (BATTERY-POWERED) | STATION-D | – | – |
| 5 (BATTERY-POWERED STATIONS EXIST) | STATION-A (BATTERY-POWERED) | STATION-B (BATTERY-POWERED) | STATION-C | STATION-D |
| 6 (BATTERY-POWERED STATION EXISTS) | STATION-A (BATTERY-POWERED) | STATION-C | STATION-D | – |
| 7 | (INDICATION OF SINGLE USER) | | | |

FIG. 23

| GROUP ID | MEMBER 1 | MEMBER 2 | MEMBER 3 | MEMBER 4 |
|---|---|---|---|---|
| 0 | STATION-A | STATION-B | STATION-C | STATION-D |
| 1 | STATION-A | STATION-C | STATION-D | - |
| 2 | STATION-B | STATION-D | - | - |
| 3 | STATION-C | STATION-E | - | - |
| 4 | STATION-D | STATION-E | - | - |
| 5 | (NOT SET) | | | |
| 6 | (NOT SET) | | | |
| 7 | (DESTINED FOR SINGLE STATION) | | | |

FIG. 25

| GROUP ID | MEMBER 1 | MEMBER 2 | MEMBER 3 | MEMBER 4 |
|---|---|---|---|---|
| 0 | STATION-F | STATION-G | STATION-H | STATION-I |
| 1 | STATION-F | STATION-H | -- | -- |
| 2 | (NOT SET) | | | |
| 3 | (NOT SET) | | | |
| 4 | (NOT SET) | | | |
| 5 | (NOT SET) | | | |
| 6 | (NOT SET) | | | |
| 7 | (DESTINED FOR SINGLE STATION) | | | |

FIG. 26

| GROUP ID | MEMBER OR NOT | RANK |
|---|---|---|
| 0 | YES | FOURTH |
| 1 | YES | THIRD |
| 2 | YES | SECOND |
| 3 | NO | -- |
| 4 | YES | FIRST |
| 5 | NO | -- |
| 6 | NO | -- |
| 7 | (SINGLE USER MIMO TRANSMISSION) | -- |

WIRELESS COMMUNICATION SYSTEM AND ACCESS POINT APPARATUS

CROSS-REFERENCE TO RELATED APPLICATIONS

This application is a 371 U.S. National Stage of International Application No. PCT/JP2012/061037, filed Apr. 25, 2012, which claims priority to Japanese Patent Application 2011-100143, filed Apr. 27, 2011. The disclosures of the above applications are incorporated herein by reference.

TECHNICAL FIELD

The present invention relates to a wireless communication system in which an access point apparatus performs simultaneous transmission to a plurality of station apparatuses and a technology of assigning group identifiers (IDs) so as not to overlap with those of adjacent communication cells when the plurality of station apparatuses, which are transmission targets in the access point apparatus, are grouped.

BACKGROUND ART

In recent years, as high-speed wireless access systems using a 2.4 GHz band or a 5 GHz band, spread of the IEEE (the Institute of Electrical and Electronics Engineers) 802.11g standard, the IEEE 802.11a standard, and so on is remarkable. In these systems, a maximum transmission rate of 54 Mbps (bits per second) in a physical layer has been achieved using an orthogonal frequency-division multiplexing (OFDM) modulation scheme, which is a technology for stabilizing the property in multipath fading environments. It is to be noted that the transmission rate referred to here is a transmission rate on the physical layer, and the actual transmission efficiency in a medium access control (MAC) layer is approximately a little less than 70%. As a result, an upper limit of the actual throughput is approximately 30 Mbps. Moreover, since the transmission efficiency of the MAC layer is further reduced as the number of communication parties which require information is increased, the throughput is also reduced.

On the other hand, in wired local area networks (LANs), a fiber-to-the-home (FTTH) using optical fibers, including a 100 Base-T interface of the Ethernet (registered trademark), is spreading to each individual home. In this way, provision of high-speed lines of 100 Mbps is spreading, and a further increase in the transmission rate is required even in the world of the wireless LANs.

As a technology for increasing the transmission rate in the wireless LANs, the IEEE 802.11n has introduced a multiple-input multiple-output (MIMO) technology, which is a spatial-multiplexing transmission technology. Moreover, in the IEEE 802.11 ac, a multi-user MIMO (MU-MIMO) transmission method, which performs spatial multiplexing for a plurality of users, is being studied (Non-Patent Document 1).

In order to efficiently utilize multi-user MIMO communications in wireless LANs, which are autonomous distributed systems, indication of a group ID using header information appended to the head of a wireless frame is being studied in the IEEE 802.11ac. In the IEEE 802.11ac, this group ID is included in a field called a very high throughput (VHT) signal.

FIG. 21 is a diagram illustrating an example of a configuration of a conventional communication system. The illustrated communication system is provided with an access point 50 and a plurality of stations 60-1 to 60-K (hereinafter, they are simply denoted as "station(s) 60" with respect to common matters for the stations). The access point 50 is provided with a data selection/output unit 5-1, a transmission signal generation unit 5-2, a wireless signal transmission/reception unit 5-3, transmission/reception antennas 5-4-1 to 5-4-N, a reception signal demodulation unit 5-5, a channel information generation unit 5-6, a group-ID table storage unit 5-7, and a group-ID control unit 5-8. Each station 60 is provided with transmission/reception antennas 6-1-1 to 6-1-Mi (i is an integer in a range from 1 to K), a wireless signal transmission/reception unit 6-2, a reception signal demodulation unit 6-3, a transmission signal generation unit 6-4, a group-ID determination unit 6-5, and a group-ID list storage unit 6-6. Here, K denotes the number of the stations 60, Mi denotes the number of the transmission/reception antennas of an i-th station, and N denotes the number of the transmission/reception antennas of the access point 50.

Transmission from the access point 50 to the stations 60 will be considered. Upon input of a transmission data group for one or more stations 60 to the access point 50, the data selection/output unit 5-1 selects data to be transmitted from among the input transmission data group. The data selection/output unit 5-1 then outputs the selected data to the transmission signal generation unit 5-2. Moreover, the data selection/output unit 5-1 outputs information on a set of destination stations 60 to the group-ID control unit 5-8. The group-ID control unit 5-8 refers to a group ID table retained in the group-ID table storage unit 5-7 to acquire a group ID corresponding to the input information on the set of the stations. The group-ID control unit 5-8 outputs the acquired group ID to the transmission signal generation unit 5-2. Here, the group ID table is a table which associates sets of stations 60 with groups to which the sets of stations 60 are currently allocated by the access point 50 among all the group IDs that are available to the access point 50.

The transmission signal generation unit 5-2 performs modulation and coding on the input data, adds control signals such as a pilot signal used for signal detection and a signal for channel estimation, and generates a wireless frame. The transmission signal generation unit 5-2 outputs the generated wireless frame to the wireless signal transmission/reception unit 5-3. At this time, the group ID designated by the group-ID control unit 5-8 is stored in particular bits included in the wireless frame as header information disposed at, for example, the head of the wireless frame. The channel information generation unit 5-6 inputs channel information corresponding to the destination stations 60 of the wireless frame to the transmission signal generation unit 5-2. The transmission signal generation unit 5-2 calculates transmission weights using the channel information and performs a directivity control process of transmission signals. The wireless signal transmission/reception unit 5-3 upconverts the input signal into a carrier frequency and performs transmission through the transmission/reception antennas 5-4-1 to 5-4-N.

The K stations 60-1 to 60-K, which are communication parties, each operate as follows. A wireless signal received through the transmission/reception antennas 6-1-1 to 6-1-Mi is input to the wireless signal transmission/reception unit 6-2. The wireless signal transmission/reception unit 6-2 performs downconversion on a carrier frequency and inputs to the reception signal demodulation unit 6-3. The reception signal demodulation unit 6-3 extracts a received wireless frame using, for example, an autocorrelation process, decodes a signal, and output data.

The group-ID determination unit 6-5 extracts group ID information indicating the destination of a transmission signal from the received wireless frame. Then, the group-ID determination unit 6-5 refers to a group ID list recorded in the group-ID list storage unit 6-6 and determines whether the station 60 itself is a member of the group ID. Here, the group ID list is information indicating whether the station 60 itself is a member of each group ID. If a group ID which does not include the station 60 itself as a member is detected, the group-ID determination unit 6-5 controls the reception signal demodulation unit 6-3 to stop a decoding process of the received signal. As a result, unnecessary decoding operations, i.e., decoding operations of wireless frames that are not destined for the station 60 itself, are eliminated, and the power consumption can be reduced.

If the station 60 itself is a member of the group ID, it is considered that received data is destined for the station 60 itself, and the reception signal demodulation unit 6-3 performs a demodulation operation. Moreover, when the received data includes an instruction for updating the group ID to which the station 60 itself belongs, the group ID list of the station 60 itself retained in the group-ID list storage unit 6-6 is updated.

On the other hand, the following process is performed when transmission from a station 60 to the access point 50 is performed. Once transmission data is generated, the transmission signal generation unit 6-4 performs modulation and coding on the transmission data to generate a signal. Moreover, the transmission signal generation unit 6-4 adds a control signal such as a pilot signal to the generated signal and outputs to the wireless signal transmission/reception unit 6-2. The wireless signal transmission/reception unit 6-2 upconverts an input signal into a carrier frequency and performs transmission through at least one of the transmission/reception antennas 6-1-1 to 6-1-Mi.

In the access point 50, the wireless signal transmission/reception unit 5-3 performs downconversion on a wireless signal received through at least one of the transmission/reception antennas 5-4-1 to 5-4-N and outputs to the reception signal demodulation unit 5-5. Channel information used for demodulation or fed-back channel information between the station 60 and the access point 50 that is included in a demodulated signal is input to the channel information generation unit 5-6. The channel information generation unit 5-6 performs optimization such as calibration on the input channel information to generate transmission weights and outputs to the transmission signal generation unit 5-2.

FIG. 22 is a diagram illustrating an example of a communication environment using group IDs. It is to be noted that in FIG. 22, for convenience of explanation, the access point 50 is denoted as "Y" and the plurality of stations 60 are denoted as letters "A" to "E". FIG. 23 is a diagram illustrating a group ID table retained in the group-ID table storage unit 5-7 of the access point Y. The group ID table is a table which associates sets of stations with groups to which the sets of stations are currently allocated by the access point Y among all the group IDs that are available to the access point Y.

In the example of FIG. 23, an example in which when the group IDs available to the access point Y are defined using the integers in a range from 0 to 7, group IDs 0 to 4 are allocated to sets of five stations (the station-A, the station-B, the station-C, the station-D, and the station-E), which are in the control of the access point Y, is illustrated. A group ID 7 indicates that communications destined for a single station are performed, and each station is notified of the group IDs 0 to 4 in advance as a group ID list specific to each station. For example, the station-B can recognize that a signal destined for the station-B itself has been transmitted when the group ID is 1 or 3, and the corresponding ranks as a member are second and first, respectively. By referring to these ranks, it is possible to recognize which one of signals that have been subjected to transmission beamforming is destined for the station-B itself Alternatively, it is possible to simply designate only the formation of member stations, instead of including these ranks in information on group IDs.

The access point Y can notify each station of a group ID using part of information included in a wireless frame, e.g., a header portion at the head of the wireless frame. For example, when a wireless frame is to be transmitted to four stations including the station A, the station B, the station C, and the station D, 0 is set therein because it can be seen from the group ID table of FIG. 23 that the corresponding group ID is 0.

A wireless frame includes a header portion and a data portion, and thus it is possible to communicate information on a transmission destination and a transmission source as well as information required for the stations A, B, C, and D to demodulate data. Once a wireless frame has been transmitted, all the stations that are capable of communicating with the access point Y acquire synchronization for the wireless frame and then attempt to demodulate a header portion. The stations A, B, C, D, and E read from the header portion that the group ID is equal to 0. The stations A, B, C, and D each refer to a group ID list retained by each station, determine that a signal is destined for each station itself, and demodulate the subsequent reception signal. It is to be noted that the group ID list retained by each station is notified from the access point Y in advance. In contrast, since it is possible for the station E to determine that the wireless frame is not destined for the station E itself when the group ID that is equal to 0 is read, the station E stops the subsequent reception operation until transmission of the wireless frame is completed.

That is, each station refers to the group ID included in the received wireless frame as to whether each station itself is a member thereof, so that it is possible to determine whether the subsequent reception process is required. As a result, a reduction in the consumed power related to the reception process can be achieved.

PRIOR ART DOCUMENTS

Non-Patent Documents

Non-Patent Document 1: Q. H. Spencer, C. B. Peel, A. L. Swindlehurst, and M. Haardt, "An introduction to the multi-user MIMO downlink", IEEE Comm. Magazine, October 2004, pp. 60-67.

Non-Patent Document 2: J. Kim, et al., "GroupID Concept for Downlink MU-MIMO Transmission," doc.:IEEE 802.11-10/0073r2. https://mentor.ieee.org/802.11/dcn/10/11-10-0073-02-00ac-group-id-concept-for-dl-mu-mimo.ppt

SUMMARY OF INVENTION

Problems to be Solved by the Invention

However, considering a case in which access points 50, which operate in accordance with autonomous distributed control, coexist in the same frequency band, in general, adjacent communication cells do not operate cooperatively while communicating with each other. Moreover, when the number of the stations 60 is large, a case in which group IDs cannot be segregated is anticipated. In such a case, an event in which group IDs of adjacent communication cells overlap with each other occurs.

FIG. 24 is a schematic diagram when the access point Y exists in a communication area of another access point Z, which operates in the same frequency band as that of the access point Y. The access point Y and the access point Z operate at the same frequency. The access point Z is communicating with four stations (a station F, a station G, a station H, and a station I). FIG. 25 is a diagram illustrating a group ID table of the access point Z. It is to be noted that the access point Z does not denote one particular access point, and it denotes all the other access points when the access point Y operates in the same frequency band within the communication area of the access point Z.

Here, it is assumed that the access point Z transmits a signal to stations of the group ID 0. All the stations that are capable of detecting the signal transmitted from the access point Z decode the group ID. FIG. 24 illustrates an operation of each station when the access point Z transmits a wireless frame designating the group ID 0. In this case, a signal of the wireless frame arrives at the station D of the access point Y. The station D decodes the wireless frame and reads that the group ID is set to "0". FIG. 26 is a diagram illustrating a group ID list provided in the station D. As shown in FIG. 26, the station D has been notified from the access point Y that the station D is a member of the group ID 0. Therefore, the station D determines that there is a possibility that a frame destined for the station D itself has arrived at, refers to header information, and executes decoding of a payload portion.

However, in this case, since the signal transmitted from the access point Z is not destined for the station D, if a packet is encrypted, a decoding error occurs in the station D. Moreover, if encryption is not performed or if decoding has been successfully performed by chance despite the fact that encryption is performed, the station D refers to destination station information in a payload that follows the wireless frame and determines that the signal is not destined for the station D itself because the station D is not set therein. In any case, this operation of the station D means that a wireless frame which is not originally required to be decoded has been received and processed, and thus power has been consumed unnecessarily.

Moreover, operations similar to the above occur in the stations F and G when the access point Y transmits a wireless frame of the group ID 0. In this way, there is a problem in that when a plurality of access points using the same frequency band exists in overlapping communication areas, if the same group ID is used by the access points, the consumed power of stations is increased. In addition, under the present circumstances in which setting methods of group IDs are limited, there is a strong possibility that adjacent communication cells use overlapping group IDs.

In view of the above circumstances, an object of the present invention is to provide a technology of reducing, in a system which performs wireless communications from an access point to stations using group identification information (group ID), the frequency in which group identification information overlapping with that of another access point is used.

Means for Solving the Problems

An aspect of the present invention is a wireless communication system in which an access point apparatus performs simultaneous transmission to a plurality of station apparatuses, the access point apparatus includes: a group storage unit which stores an association between a station apparatus included in a group that is a target for the simultaneous transmission and group identification information; a group identification information notification unit which notifies each station apparatus included in the group of the group identification information; an another identification information acquisition unit which acquires group identification information that is being used by another access point apparatus; and an identification information change unit which, if group identification information that is being used by the access point apparatus itself overlaps with the group identification information that is being used by the other access point apparatus, changes the group identification information so as to reduce the number of pieces of overlapping group identification information, and the station apparatuses each include a notification unit which receives a signal including group identification information that corresponds to each station apparatus itself, and, if a predetermined condition indicating that the signal is not destined for each station apparatus itself is satisfied, notifies the access point apparatus which is a party with which each station apparatus itself performs wireless communication of the fact that there is an overlap with respect to the group identification information of the signal that satisfies the predetermined condition.

An aspect of the present invention is an access point apparatus in a wireless communication system in which the access point apparatus performs simultaneous transmission to a plurality of station apparatuses, and the access point apparatus includes: a group storage unit which stores an association between a station apparatus included in a group that is a target for the simultaneously transmission and group identification information; a group identification information notification unit which notifies each station apparatus included in the group of the group identification information; an another identification information acquisition unit which acquires group identification information that is being used by another access point apparatus; and an identification information change unit which, if group identification information that is being used by the access point apparatus itself overlaps with the group identification information that is being used by the other access point apparatus, changes the group identification information so as to reduce the number of pieces of overlapping group identification information.

An aspect of the present invention is that in the access point apparatus, the other identification information acquisition unit receives group identification information informed by the other access point apparatus to acquire the group identification information that is being used by the other access point apparatus.

An aspect of the present invention is that in the access point apparatus, the other identification information acquisition unit receives and acquires group identification information informed by the other access point apparatus from the station apparatus.

An aspect of the present invention is that in the access point apparatus, if the sum of the number of pieces of group identification information that are being used by the access point apparatus itself and the number of pieces of group identification information that are being used by the other access point apparatus is larger than the total number of pieces of group identification information that are available to the access point apparatus itself, the identification information change unit calculates the total amount of traffic for each of the pieces of the group identification information that are being used by the access point apparatus itself and preferentially changes group identification information of a group that has the total amount of the traffic which is larger than those of the other groups to group identification information that is not used by the other access point apparatus.

An aspect of the present invention is that in the access point apparatus, the identification information change unit preferentially changes group identification information of a group that has the total amount of traffic which is smaller than those of the other groups to the group identification information that is being used by the other access point apparatus.

An aspect of the present invention is that in the access point apparatus, if the sum of the number of pieces of group identification information that are being used by the access point apparatus itself and the number of pieces of group identification information that are being used by the other access point apparatus is larger than the total number of pieces of group identification information that are available to the access point apparatus itself, the identification information change unit acquires the number of transmissions of wireless frames destined for the station apparatus corresponding to the group identification information during a given past period for each of the pieces of the group identification information that are being used by the access point apparatus itself and preferentially changes group identification information of a group having the number of transmissions which is larger than those of the other groups to group identification information that is not used by the other access point apparatus.

An aspect of the present invention is that in the access point apparatus, the identification information change unit preferentially changes group identification information of a group having a smaller number of transmissions than those of the other groups to the group identification information that is being used by the other access point apparatus.

An aspect of the present invention is that in the access point apparatus, if the sum of the number of pieces of group identification information that are being used by the access point apparatus itself and the number of pieces of group identification information that are being used by the other access point apparatus is larger than the total number of pieces of group identification information that are available to the access point apparatus itself, the identification information change unit preferentially changes group identification information of a group which includes a battery-powered station apparatus to group identification information that is not used by the other access point apparatus.

Advantageous Effects of Invention

The present invention detects overlaps of group IDs between a plurality of communication cells and reduces the overlaps, so that it is possible to prevent the consumed power of stations from being increased. In particular, it is possible to realize extension of an operating time of a portable station which is not connected to an external power supply and operates with a battery.

BRIEF DESCRIPTION OF DRAWINGS

FIG. 4 is a diagram showing the state of a group ID table of an access point Y.
FIG. 5 is a diagram showing group-ID environment information when a group ID table of an access point Z is detected.
FIG. 6 is a diagram illustrating an updated group ID table.
FIG. 7 is a diagram illustrating an updated group ID table.
FIG. 8 is a diagram illustrating throughput information.
FIG. 9 is a diagram illustrating an updated group ID table.
FIG. 10 is a diagram illustrating an example of a group ID table.
FIG. 11 is a diagram illustrating an example of group-ID environment information.
FIG. 12 is a diagram illustrating an example of an updated group ID table.
FIG. 13 is a diagram illustrating an example of an updated group ID table.
FIG. 14 is a diagram illustrating an example of group-ID environment information.
FIG. 15 is a diagram illustrating an example of an updated group ID table.
FIG. 16 is a diagram illustrating an example of a group ID table.
FIG. 17 is a diagram illustrating an example of group-ID environment information.
FIG. 18 is a diagram illustrating an example of an updated group ID table.
FIG. 19 is a diagram illustrating an example of an updated group ID table.
FIG. 23 is a diagram illustrating a group ID table retained in a group-ID table storage unit 5-7 of the access point Y.
FIG. 25 is a diagram illustrating a group ID table of the access point Z.
FIG. 26 is a diagram illustrating a group ID list provided in a station D.

MODES FOR CARRYING OUT THE INVENTION

[First Embodiment]

Hereinafter, a first embodiment of a wireless communication system in which an access point and a plurality of stations perform wireless communications will be described.

Figures 1, 2:
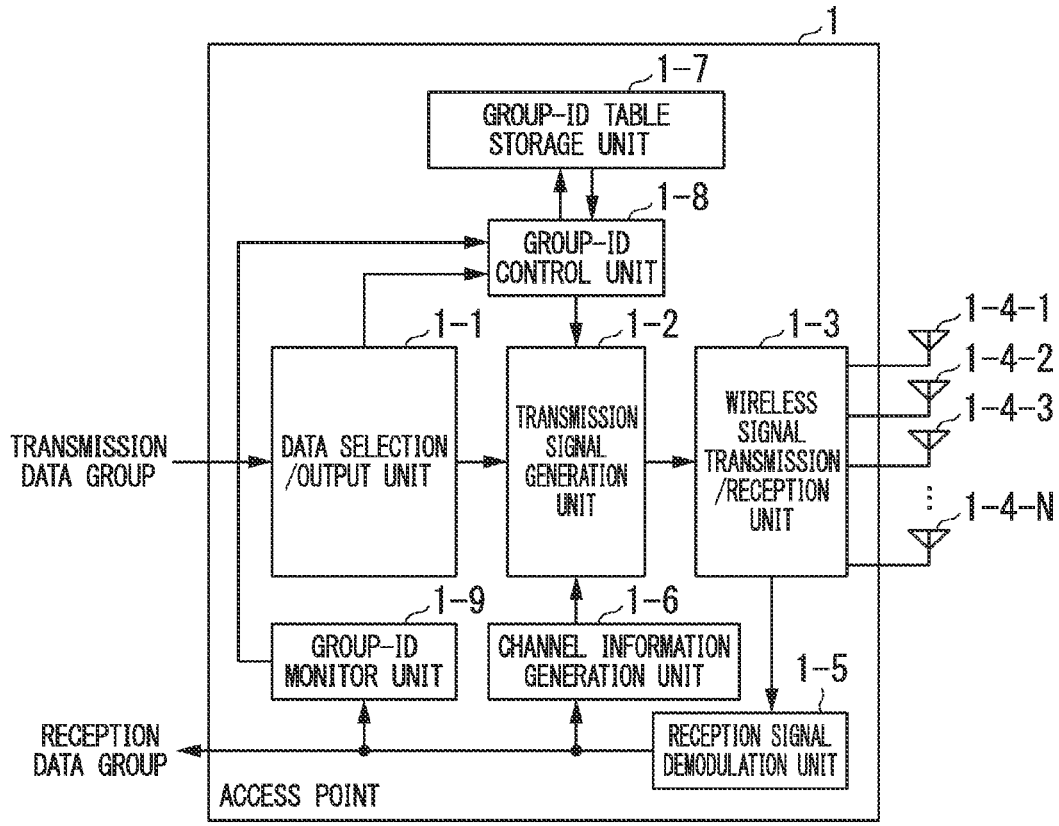
FIG. 1 is a diagram showing a functional configuration of an access point 1.
FIG. 2 is a diagram illustrating an updated group ID table.
Figure 21:
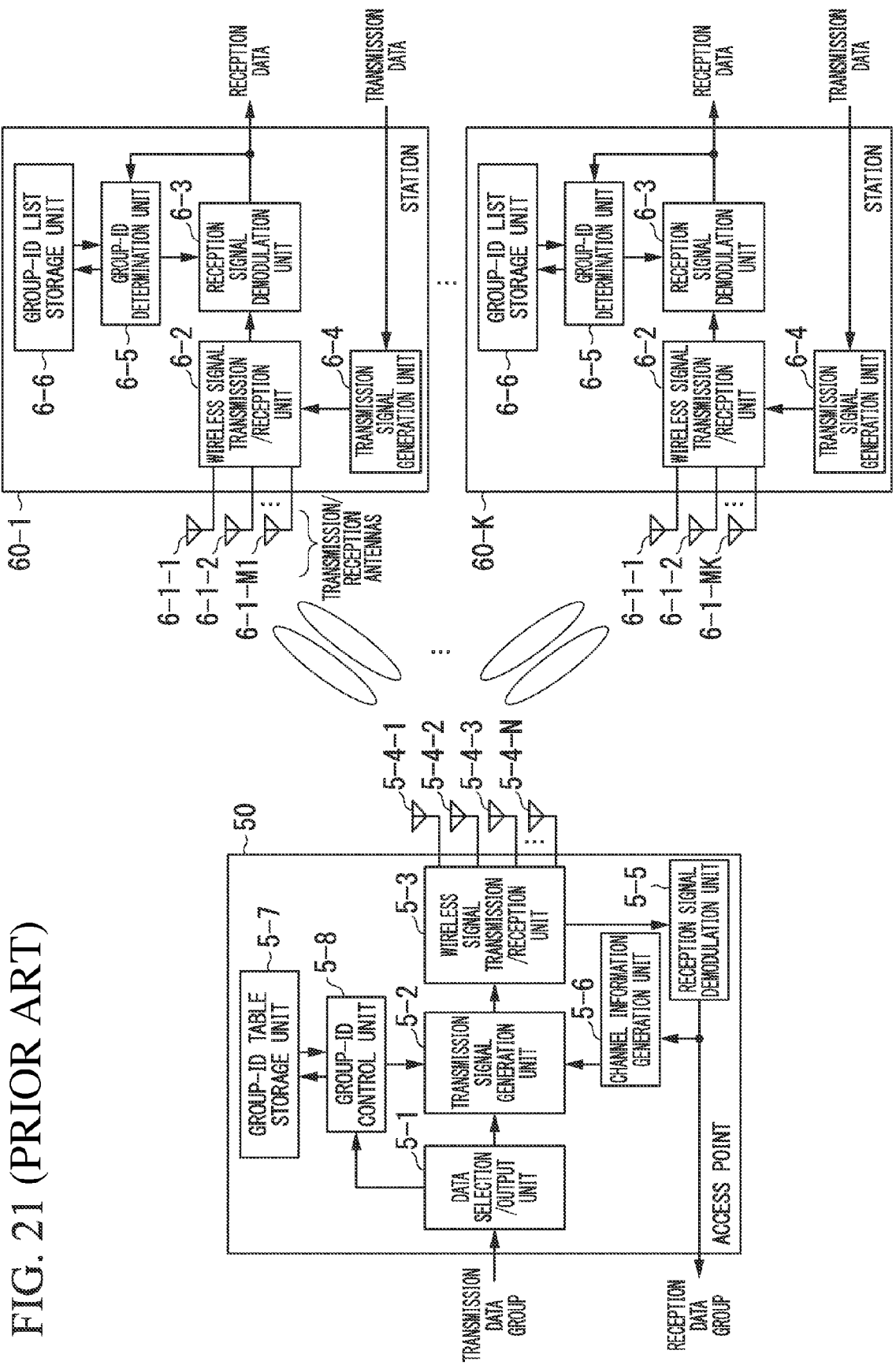
FIG. 21 is a diagram illustrating an example of a configuration of a conventional communication system.
Figure 22:
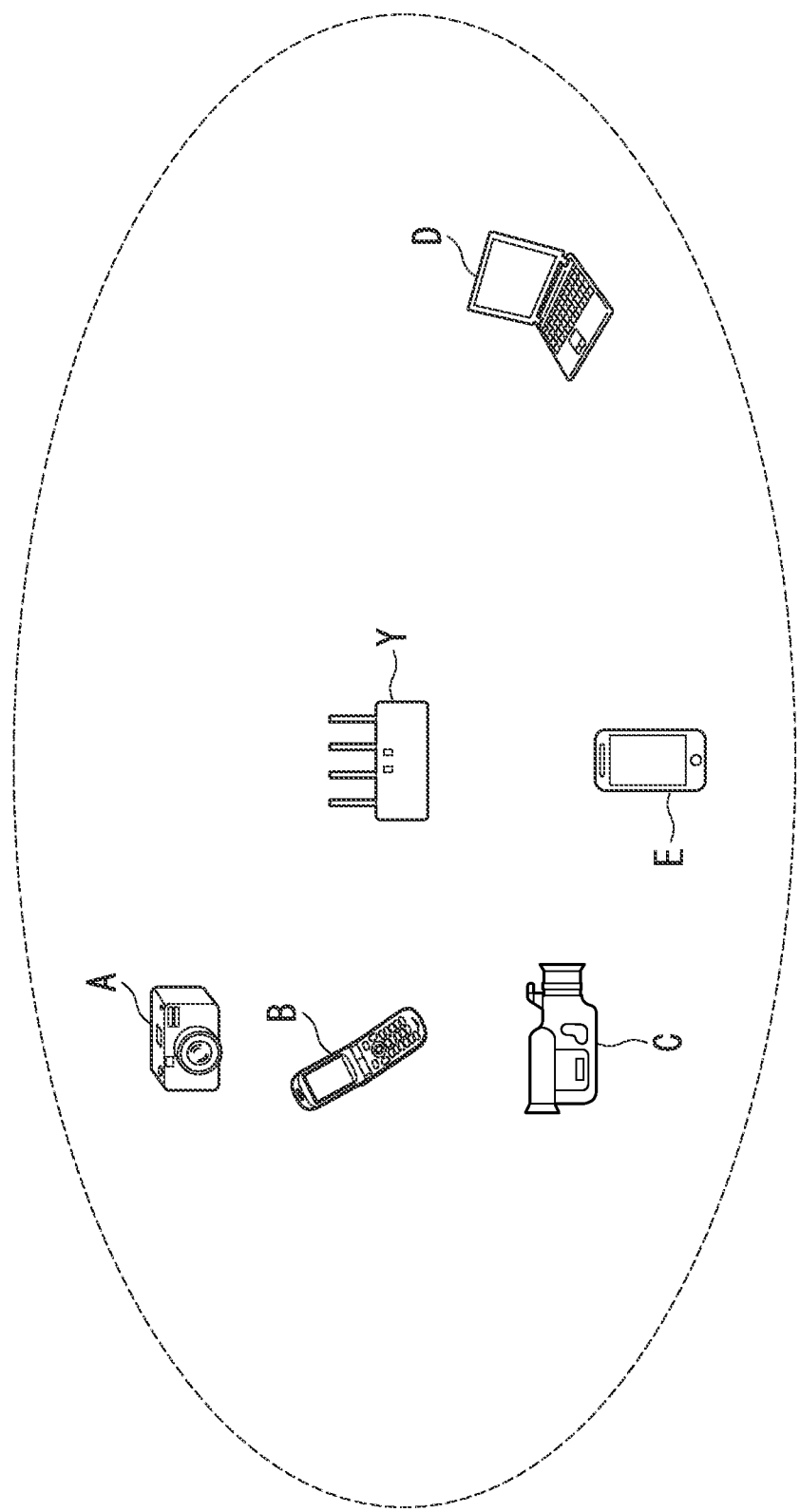
FIG. 22 is a diagram illustrating an example of a communication environment using group IDs.

FIG. 1 is a diagram showing a functional configuration of an access point 1. The access point 1 is provided with a data selection/output unit 1-1, a transmission signal generation unit 1-2, a wireless signal transmission/reception unit 1-3, transmission/reception antennas 1-4-1 to 1-4-N, a reception signal demodulation unit 1-5, a channel information generation unit 1-6, a group-ID table storage unit 1-7, a group-ID control unit 1-8, and a group-ID monitor unit 1-9. N denotes the number of the transmission/reception antennas of the access point 1. It is to be noted that the configuration of stations in the first embodiment is the same as the conventional configuration shown in FIG. 21. Moreover, in the following description, the access point 1 is denoted as an access point Y where appropriate.

The first embodiment is characterized in that the access point 1 is provided with the group-ID monitor unit 1-9. That is, the group-ID monitor unit 1-9 acquires a group ID (group identification information) that is being used by another access point. The other access point refers to an access point that has a communication cell that overlaps with a communication cell of the access point 1. For example, the other access point may be an access point of a communication cell that is adjacent to the access point 1, and it may be an access point that is not adjacent thereto but has a communication cell that overlaps therewith. In the following description, an example in which the other access point is an adjacent access point will be described. The group identification information refers to identification information which is uniquely assigned by the access point 1 to a group of stations which communicate with the access point 1 itself. If the group ID being used by another access point overlaps with a group ID being used by the access point 1 itself, the group-ID monitor unit 1-9 changes the group ID being used by the access point 1 itself. This change makes it possible to reduce the frequency in which group identification information that overlaps with that of the other access point is used. Therefore, it is possible to reduce the frequency in which a station performs a reception process of a wireless frame to which an overlapping group ID has been attached by the other access point and which have been transmitted by the other access point. As a result, the consumed power in the station can be reduced.

Figure 24:
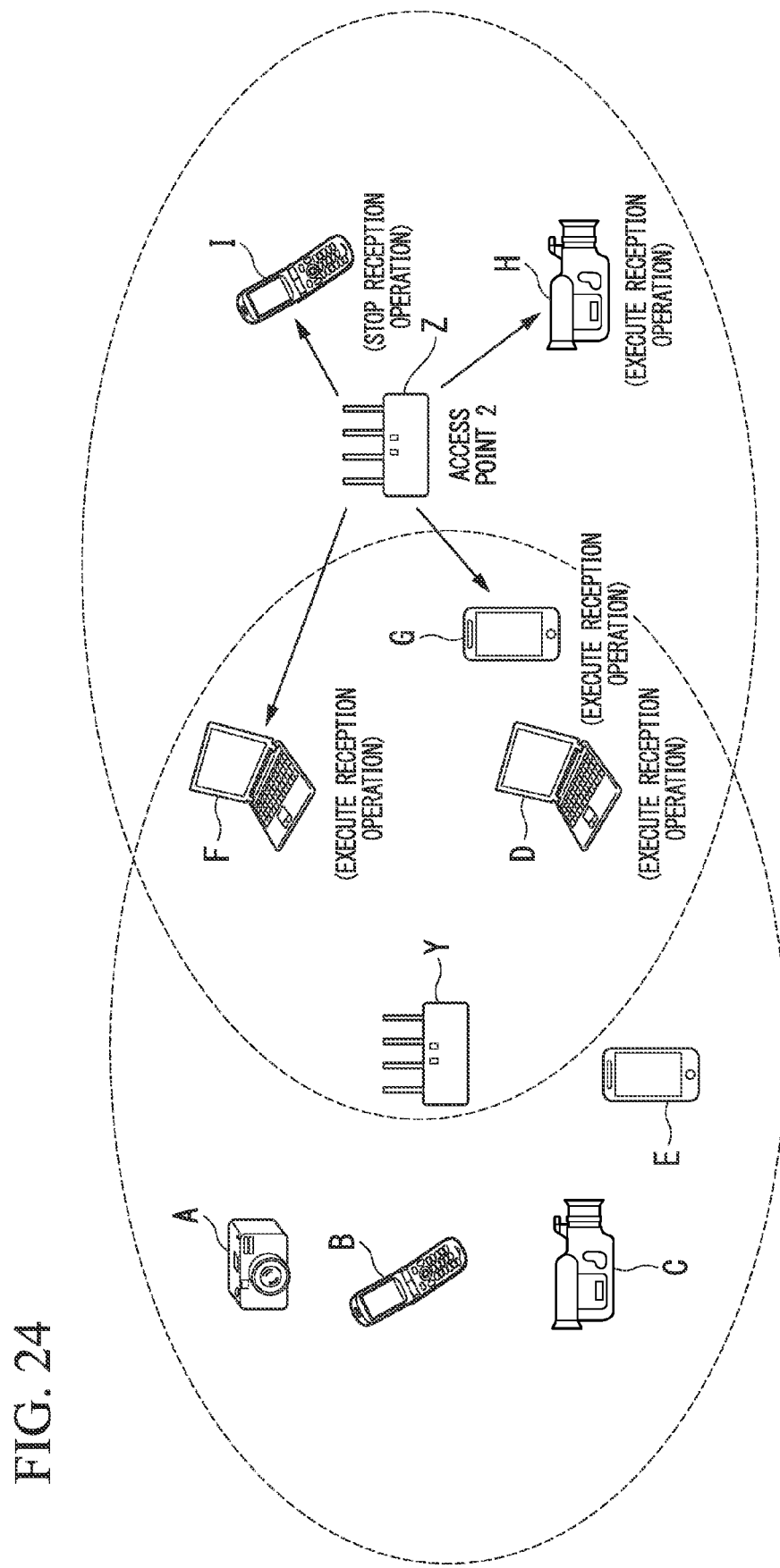
FIG. 24 is a schematic diagram when another access point Z that operates using the same frequency band is present within a communication area of the access point Y.

As shown in FIG. 24, under a communication environment in which communication areas (the ranges of communication cells) overlap with each other, the access point Y can receive a wireless frame from the adjacent access point Z if the access point Y is present in a communication area of the adjacent access point Z. When the wireless frame is transmitted from the adjacent access point Z, the access point Y receives a wireless signal using at least one of the transmission/reception antennas 1-4-1 to 1-4-N, and the reception signal demodulation unit 1-5 performs demodulation to acquire a signal. The group-ID monitor unit 1-9 monitors whether a group ID indicating a destination station group of the frame is included in the demodulated signal, and if the group ID has been detected, the group-ID monitor unit 1-9 determines that the group ID is being used in the other access point Z and outputs to the group-ID control unit 1-8.

In general, since a data portion of a wireless frame destined for each user is encrypted, it is impossible for stations other than a destination station to perform reading. However, since high-speed processing is required with respect to a header portion which stores information on a physical layer that is necessary for demodulating a wireless frame and it is necessary for the stations other than the destination station to refer thereto, there are many cases in which encryption is not performed. Wireless frames that are being studied in the IEEE 802.11 TGac have similar configurations, and a header portion which stores information that is necessary for performing demodulation in a physical layer (a header portion which stores information on the physical layer), including a group ID, is transmitted in a format that can be read by all the stations, i.e., without encryption.

Here, the IEEE 802.11 TGac defines MU-MIMO transmissions using group IDs only for downlinks from an access point to stations, and thus transmission sources are limited to access points. Therefore, if the access point Y has extracted a group ID from a received signal, this means that the other adjacent access point Z that is operating in the same frequency band is using the group ID. Therefore, the access point Y can determine that the group ID is being used by the access point Z of an adjacent communication cell by detecting that the group ID is included in the received signal, irrespective of its transmission source. Here, as described above, the access point Z does not denote one particular access point, and it denotes all the other access points when the access point Y operates in the same frequency band within the communication area of the access point Z. It is not necessary for the access point Y to recognize which access point is using the group ID, and it is sufficient for the access point Y to recognize that the group ID is being used by another access point which operates in the same frequency band within the communication area of the access point Y.

The group-ID control unit 1-8 refers to a group ID table retained in the group-ID table storage unit 1-7 and determines whether the group ID, for which the fact of being used by the other access point Z has been detected, is already being used by the access point Y. If it is being used, the group-ID control unit 1-8 allocates a set of stations allocated to the group ID to another unused group ID and stores the fact that the group ID is already being used by the other access point Z.

As an example, it is assumed that in a case in which the access point Y retains the group ID table shown in FIG. 23 and the adjacent access point Z retains the group ID table shown in FIG. 25, the adjacent access point Z transmits wireless frames destined for sets of stations of the group IDs 0 and 1.

The access point Y receives the wireless frames which include the group IDs 0 and 1. The group-ID monitor unit 1-9 detects the group IDs included in the wireless frames to recognize that the group IDs 0 and 1 are being used by the adjacent access point Z. Moreover, the group-ID monitor unit 1-9 detects that the group IDs 0 and 1 are being used by both the access point Y and the adjacent access point Z with reference to this information and the group ID table.

Thus, the group-ID control unit 1-8 allocates a group ID 5, which is currently vacant, to a set of stations of the group ID 0, i.e., a set of stations including the station-A, the station-B, the station-C, and the station-D. Similarly, with respect to the group ID 1, the group-ID control unit 1-8 allocates a group ID 6 to a set of stations including the station-A, the station-C, and the station-D anew. Furthermore, the group-ID control unit 1-8 updates the group ID table so as to indicate that the adjacent access point Z is using the group IDs 0 and 1. FIG. 2 is a diagram illustrating the updated group ID table.

After the group ID table has been updated, the access point Y notifies each station of information on updated group ID lists (updated information). Stations which have received the updated information change group ID lists retained by the stations themselves. In this example, group ID lists retained by the station-A, the station-B, the station-C, and the station-D are changed. After all the stations have been notified of the group ID lists, even if the adjacent access point Z transmits wireless frames of the group IDs 0 and 1, the stations which are in the control of the access point Y can determine that the wireless frames are not destined for the stations themselves because the group IDs included in the wireless frames are not associated with the stations themselves, and thus it is possible to avoid redundant reception operations.

Moreover, when the adjacent access point Z transmits a wireless frame which includes information indicative of updating a group ID list and the access point Y receives the wireless frame, the access point Y can determines an overlap of the group ID from the group ID list. To this end, the group-ID monitor unit 1-9 outputs an extracted group ID list to the group-ID control unit 1-8. The group-ID control unit 1-8 uses the group ID list as information for avoiding the overlap of the group ID.

In the above description, the access point Y has the configuration of the access point 1 shown in FIG. 1. On the other hand, the access point Z may have the configuration of the access point 1 shown in FIG. 1, or it may have a configuration of a conventional access point. Next, particulars of the first embodiment when both the access point Y and the access point Z have the configuration of the access point 1 shown in FIG. 1 will be described.

When both the access point Y and the adjacent access point Z update group IDs in the same manner, there is a possibility that updated group IDs overlap with each other again. Accordingly, for example, the access point Y may perform a process of dividing, at predetermined intervals, a period during which group IDs transmitted from the adjacent access point Z are observed, determining whether there is an overlap of a group ID in each period, and changing the group ID if overlaps continue a predetermined number of times. Moreover, the possibility that two access points change group IDs at the same time is reduced by setting different predetermined numbers of times for the access points using, for example, random numbers. As a result, even if the two access points update the group IDs in the same manner, it is possible to reduce the possibility that updated group IDs overlap with each other.

[Second Embodiment]

Figure 3:
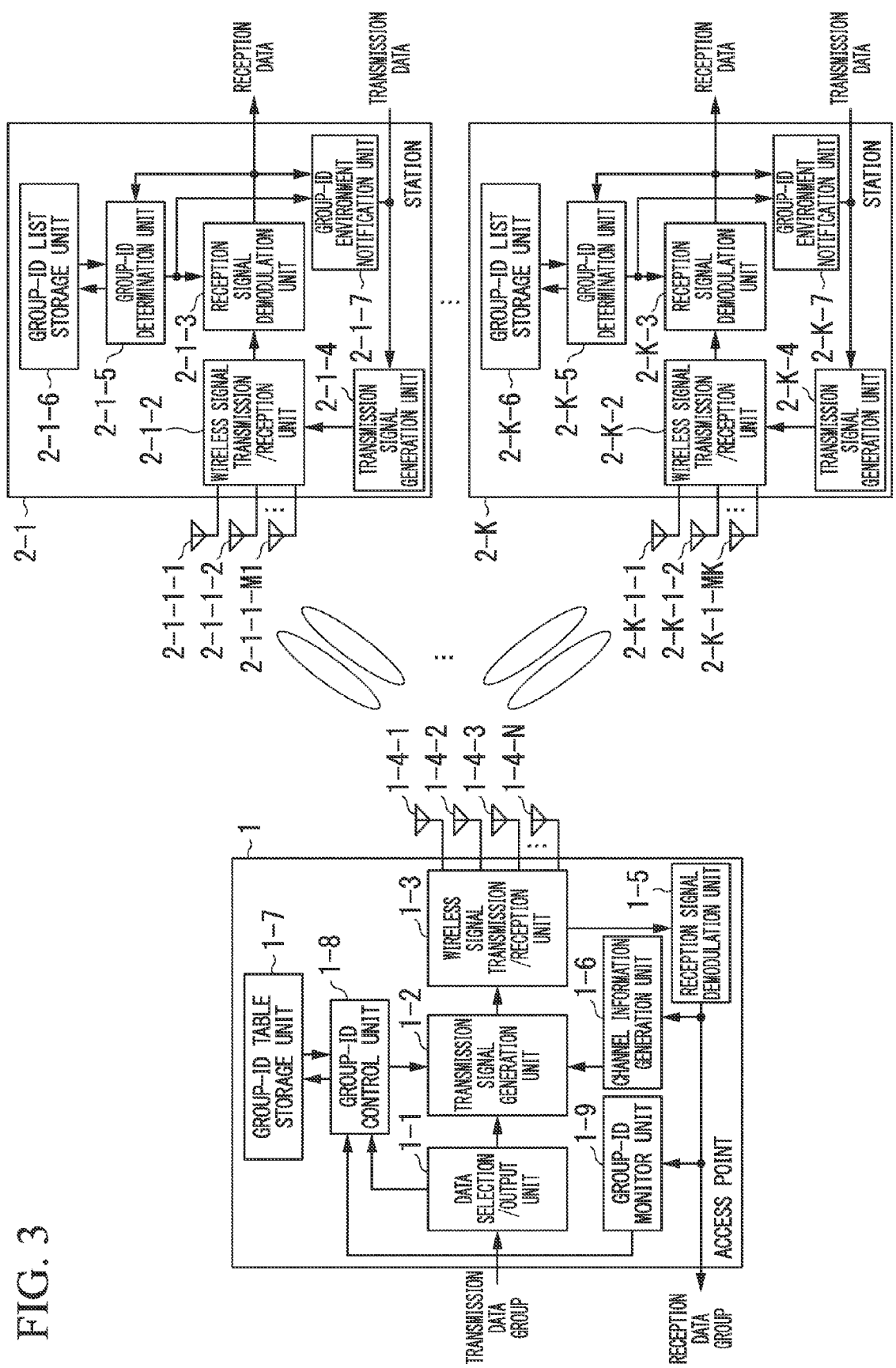
FIG. 3 is a diagram illustrating a functional configuration of a wireless communication system in a second embodiment.

Next, a second embodiment of the wireless communication system will be described. FIG. 3 is a diagram illustrating a functional configuration of the wireless communication system in accordance with the second embodiment. In FIG. 3, an access point 1 is provided with a data selection/output unit 1-1, a transmission signal generation unit 1-2, a wireless signal transmission/reception unit 1-3, transmission/reception antennas 1-4-1 to 1-4-N, a reception signal demodulation unit 1-5, a channel information generation unit 1-6, a group-ID table storage unit 1-7, a group-ID control unit 1-8, and a group-ID monitor unit 1-9. A station 2-1 is provided with transmission/reception antennas 2-1-1-1 to 2-1-1-M1, a wireless signal transmission/reception unit 2-1-2, a reception signal demodulation unit 2-1-3, a transmission signal generation unit 2-1-4, a group-ID determination unit 2-1-5, a group-ID list storage unit 2-1-6, and a group-ID environment notification unit 2-1-7. With respect to the configurations of a station 2-K and the other stations, although there may be differences in the numbers of transmission/reception antennas, the remaining configurations are the same as the configuration of the station 2-1 except for the differences between reference signs. K denotes the number of the stations, Mi denotes the number of the transmission/reception antennas of an i-th station, and N denotes the number of the transmission/reception antennas of the access point 1. It is to be noted that in the following description, the stations 2-1 to 2-K are simply denoted as "station(s) 2" with respect to common matters for the stations.

The present configuration is characterized in that the group-ID environment notification unit 2-1-7 is provided in at least one of the stations 2, the group-ID monitor unit 1-9 of the access point 1 receives group-ID environment information transmitted from a station 2 and outputs to the group-ID control unit 1-8, and the group-ID control unit 1-8 detects an overlap of a group ID from the group-ID environment information and resets a group ID table in order to avoid the overlap of the group ID with the adjacent access point Z. It is to be noted that FIG. 3 illustrates that all the stations 2 are provided with group-ID environment notification units, but it is sufficient that at least one of the stations 2 is provided with the group-ID environment notification unit as described above, and it is not necessary for all the stations 2 to be provided with the group-ID environment notification units.

Under the overlapping communication environment shown in FIG. 24, a station at which a signal from the adjacent access point Z arrives receives not only a signal from an access point to which the station itself belongs but also the signal from the adjacent access point Z. When the signal from the adjacent access point Z is received, in a station 2-$i$ ($i$ is an integer in a range from 1 to K), the wireless signal transmission/reception unit 2-$i$-2 performs downconversion on a carrier frequency of the signal received from the adjacent access point Z through at least one of the transmission/reception antennas 2-$i$-1-1 to 2-$i$-1-Mi and inputs to the reception signal demodulation unit 2-$i$-3. The reception signal demodulation unit 2-$i$-3 extracts a received wireless frame by an autocorrelation process and so on, decodes a signal, and outputs data. The group-ID determination unit 2-$i$-5 extracts information on a group ID indicating the destination of a transmission signal from the wireless frame of a received data signal. If bits of a group ID are included in the wireless frame and the number of a decoded group ID is included in a table of group IDs to which the station 2-$i$ itself belongs, the group-ID determination unit 2-$i$-5 determines that there is a possibility that received data is destined for the station 2-$i$ itself In this case, although the station 2-$i$ continues decoding the received data, since the received signal is a signal destined for another station of an adjacent communication cell and is actually a signal for a different destination, the decoding is impossible due to encryption, or even if the decoding is possible it is discarded as invalid data because of the different destination.

Alternatively, even if a signal which is included in header information of a wireless frame and is necessary for decoding the wireless frame cannot be processed with the performance of the station 2-$i$, it is possible to detect a group ID that is not destined for the station 2-$i$ itself. For example, in a case in which the maximum spatial multiplexing order that can be processed by the station 2-$i$ is two, the station 2-$i$ notifies the access point 1 of information related to the performance when the station 2-$i$ comes under jurisdiction of the access point 1. If the received wireless frame is destined for the station 2-$i$ itself and is transmitted from the access point 1, to which the station 2-$i$ belongs, a parameter that is smaller than or equal to the performance (here, a spatial multiplexing order that is smaller than or equal to 2) should necessarily be used for the received wireless frame. Therefore, if this is not the case, the wireless frame is treated as a wireless frame transmitted from the other access point Z, thereby making it possible to detect a wireless frame from the other access point Z.

Furthermore, if the station 2-$i$ receives a wireless frame which has been transmitted from the adjacent access point Z to a station belonging to the adjacent access point Z and includes information indicative of updating a group ID list, it is possible to determine an overlap of a group ID with reference to this group ID list and a group ID list retained in the group-ID list storage unit 2-$i$-6 of the station 2-$i$ itself.

When a wireless frame which includes a group ID to which the station 2-$i$ itself belongs is received in this way, if decoding has been performed but the destination of the wireless frame is not the station 2-$i$ itself, if decoding errors have occurred continuously, if the received frame includes a parameter that cannot be processed with the performance of the station 2-$i$ itself, or if a group ID list transmitted to a station of the adjacent access point Z has been intercepted, the group-ID environment notification unit 2-$i$-7 stores these pieces of information as group-ID environment information.

When the group-ID environment notification unit 2-$i$-7 transmits a transmission signal to the access point 1, the group-ID environment notification unit 2-$i$-7 outputs the group-ID environment information to the transmission signal generation unit 2-$i$-4. The transmission signal generation unit 2-$i$-4 attaches the group-ID environment information to the transmission signal, and the wireless signal transmission/reception unit 2-$i$-2 performs upconversion and then performs transmission through at least one of the transmission/reception antennas 2-$i$-1-1 to 2-$i$-1-Mi. At this time, the group-ID environment information generated by the station 2 is not limited to a group ID to which the station 2 itself belongs. That is, even when the station 2 has detected another group ID, the station 2 may store that group ID and inform the access point 1 of that group ID.

In the access point 1, the wireless signal transmission/reception unit 1-3 downconverts a wireless signal received through at least one of the transmission/reception antennas 1-4-1 to 1-4-N and outputs to the reception signal demodulation unit 1-5. The group-ID monitor unit 1-9 extracts, from a decoded signal, the group-ID environment information of a station that has transmitted this signal and acquires group ID information of an adjacent communication cell. If the same group ID as that of the adjacent communication cell is used for a station that is present in a region that overlaps with that of the adjacent communication cell, the group-ID monitor unit 1-9 notifies the group-ID control unit 1-8 of the fact that this group ID is to be changed to another ID. The group-ID control unit 1-8 changes the group ID, rewrites the group-ID table storage unit 1-7, and then notifies the transmission signal generation unit 1-2 of information on the updated group ID table, and the transmission signal generation unit 1-2 generates and transmits a signal for notifying each station of the updated group ID table.

An operation of the present embodiment will be described using the overlapping communication cells shown in FIG. 24 as an example. The station-D belongs to the access point Y, and the corresponding group IDs are 0, 1, 2, and 4. In this case, as described in the first embodiment, when the access point Z performs communications designating the group ID 0, the station-D treats the communications as signals destined for the station-D itself and performs decoding. However, in fact, the access point Z is communicating with the station-F, the station-G, the station-H, and the station-I, and thus the decoding by the station-D fails.

Here, if the adjacent access point Z transmits wireless frames to stations which are in the control thereof using the group IDs 0 and 1, a decoding error occurs when the station-D receives a wireless frame including the group ID 0 or the group ID 1 that has been transmitted from the adjacent access point Z. At this time, the station-D detects the occurrence of continuous decoding errors, determines overlaps of the group ID, and notifies the access point Y, to which the station-D itself belongs, of group-ID environment information. Similar to the first embodiment, the access point Y updates a group ID table so that no overlap of group IDs occur, and notifies stations in which updating of group ID lists is required of the information.

In the first embodiment, the access point 1 detects an overlap of a group ID with another access point, but in the second embodiment, a station 2 detects a group ID and notifies the access point 1 of information thereon. Of course, it is possible to employ an apparatus having a configuration in which both the technique shown in the first embodiment in which the access point 1 detects an overlap of a group ID with another access point and the technique shown in the second embodiment in which a station 2 detects an overlap of a group ID with another access point and performs feedback to the access point 1 are applied.

[Third Embodiment]

Next, a third embodiment of the wireless communication system will be described. The wireless communication system in the third embodiment has a functional configuration in which a group ID resetting method is applied to either the configuration of the first embodiment or the configuration of the second embodiment. Group ID resetting methods when group IDs that are being used by a plurality of communication cells overlap with each other and there is no vacant group ID number include the following technique.

FIG. 4 is a diagram showing the state of a group ID table of the access point Y. FIG. 5 is a diagram showing group-ID environment information when a group ID table of the access point Z has been detected. It is to be noted that it is assumed that numbers that can be used as group IDs are eight integers from 0 to 7, in the same way as the above embodiments. That is, since there are overlaps with respect to the group IDs 0, 1, and 2 and each of them can be changed to only the group ID 5 or 6, overlaps occur with respect to part of the group IDs no matter how they are changed.

The third embodiment derives the total throughput (the total amount of traffic) of wireless frames transmitted to member stations 2 for each group ID (parenthesized portions in cells of FIG. 4). This can be obtained by measuring the data amount of transmission data groups input to the data selection/output unit 1-1 during a given period. This information is input to the group-ID control unit 1-8.

The group-ID control unit 1-8 acquires, from the group ID monitor unit 1-9, the group IDs (0, 1, and 2) that overlap with those of the adjacent access point Z. In the present embodiment, there are overlaps with respect to the group IDs 0, 1, and 2. Moreover, there are two group IDs (the group IDs 5 and 6) that are not used in the access point Y and are presumed also not to be used in the adjacent access point Z.

As the first-time group-ID reallocation operation, first, the group-ID control unit 1-8 allocates sets of stations corresponding to group IDs the number of which is equal to the number of the group IDs that are not used by both the access point Y and the adjacent access point Z (two because the group IDs 5 and 6 are not used in the present embodiment) using, as the order of priorities, the order of group IDs obtained by arranging the group IDs in descending order using throughput as a parameter. In the present embodiment, the order of the group IDs is 0, 1, 2, 3, and 4. Therefore, a set of stations of the group ID 0, i.e., the station-A, the station-B, the station-C, and the station-D, and a set of stations of the group ID 1, i.e., the station-A, the station-C, and the station-D, are allocated to the two vacant group IDs 5 and 6, respectively. FIG. 6 is a diagram illustrating a group ID table updated by this operation.

Next, as the second-time group-ID reallocation operation, if overlapping group ID(s) still exist despite the above operation, group IDs the number of which is equal to the minimum number of overlaps that must be accepted, i.e., group IDs the number of which is equal to the result obtained by subtracting "B: the total number of available group IDs" from "A: the total sum of sets of stations corresponding to group IDs that are being used in the access point Y and sets of stations corresponding to group IDs that are being used in the adjacent access point Z, are overlapped.

In the present embodiment, A is equal to eight in total because the access point Y uses five and the adjacent access point Z uses three, and B is equal to seven because the group IDs are defined as integers in a range from 0 to 7 and 7 is used for a single user.

Since A−B=8−7=1 holds, it is determined that one group ID is to be overlapped.

As a method for selecting sets of stations to be overlapped, sets of stations corresponding to group IDs having higher priorities are selected in order as overlapping candidates based on the order obtained by arranging the sets of stations in ascending order using throughput as a parameter. That is, as can be seen from FIG. 6, in the present embodiment, the order is (the station-D and the station-E), (the station-C and the station-E), and (the station-B and the station-D). Accordingly, in the present embodiment, one group ID must be overlapped. Therefore, the group ID table is updated so that the station-D and the station-E are set as a set of stations to be overlapped and overlaps can be avoided with respect to the remaining sets of stations, i.e., the station-C and the station-E as well as the station-B and the station-D. FIG. 7 is a diagram illustrating an updated group ID table.

As a result of the above change, the group ID 2 is the only overlapping group ID. Therefore, the number of overlapping group IDs is reduced, and thus it is possible to maintain the power-saving effect in stations. Moreover, since a set of stations having the smallest throughput is allocated to the overlapping target group ID, the frequency of occurrences of unnecessary reception operations by the stations belonging to the adjacent access point Z, which are caused by performing reception processes of wireless frames that use the group ID in the stations belonging to the adjacent access point Z, is reduced. Therefore, the overall power-saving effect is increased. It is to be noted that if the adjacent access point Z follows the same algorithm, the access points mutually increase the power-saving effect.

[Fourth Embodiment]

Next, a fourth embodiment of the wireless communication system will be described. The wireless communication system in the fourth embodiment has a functional configuration in which a configuration for performing a process related to group IDs of the adjacent access point Z is applied to the configuration of the third embodiment.

The third embodiment utilizes information indicating whether each group ID is used by the adjacent access point Z as information used for updating a group ID table. The fourth embodiment further recognizes the total throughputs of sets of stations of the adjacent access point Z with respect to group IDs of the adjacent access point Z and selects a set of stations allocated to a group ID to be overlapped. Throughput information can be estimated from, for example, transmission rate information indicated by header information of wireless frames and the frequency of transmissions of the wireless frames.

FIG. 8 is a diagram illustrating the throughput information. Here, it is assumed that total throughput information of the sets of stations of the adjacent access point Z is that as shown in FIG. 8. In the fourth embodiment, the first-time group-ID reallocation operation as well as derivation of the number of group IDs to be overlapped and the operation of matching priorities of sets of stations for which overlaps are accepted with throughputs in ascending order in the second-time group allocation operation are the same as those described in the third embodiment.

In addition, in the fourth embodiment, the order of priorities assigned to group IDs to be overlapped is matched with the order of throughputs of group IDs of the adjacent access point Z that are arranged in ascending order. That is, as can be seen from FIG. 8, arranging the group IDs based on the throughputs in ascending order results in the order of the group ID 1, the group ID 0, and the group ID 2. Moreover, as described previously, the order of the priorities assigned to group IDs to be overlapped for the sets of stations of the access point Y is (the station-D and the station-E), (the station-C and the station-E), and (the station B and the station D). Therefore, the station-D and the station-E are allocated to the group ID 1 and the other two sets of stations are allocated to the group IDs 3 and 4. FIG. 9 is a diagram illustrating a group ID table updated by the present operation.

As a result of the above change, the group ID 1 is the only overlapping group ID, and thus the number of overlapping group IDs can be reduced. Therefore, it is possible to maintain the power-saving effect in stations. Moreover, since a set of stations having the lowest throughput is allocated to the overlapping target group ID, the frequency of occurrences of unnecessary reception operations by the stations belonging to the adjacent access point Z, which are caused by performing reception processes of wireless frames that use the group ID in the stations belonging to the adjacent access point Z, is reduced. Therefore, the power-saving effect of the overall wireless communication system is increased.

Furthermore, since a list of stations that are allocated to the overlapping group ID by the adjacent access point Z has the smallest throughput among those of all the group IDs, it is possible to reduce the frequency of unnecessary reception operations in stations of the access point Y due to wireless frames transmitted from the adjacent access point Z.

[Fifth Embodiment]

Next, a fifth embodiment of the wireless communication system will be described. The wireless communication system in the fifth embodiment has a functional configuration in which a group ID resetting method that is different from that of the third embodiment is applied to the configuration of the first embodiment or the configuration of the second embodiment.

FIG. 10 is a diagram illustrating an example of a group ID table. FIG. 11 is a diagram illustrating an example of group-ID environment information. Here, it is assumed that a group ID table of the access point Y is that as shown in FIG. 10 and group-ID environment information detected by the process described in the first embodiment or the second embodiment is that as shown in FIG. 11. It is to be noted that it is assumed that numbers that can be used as group IDs are eight integers from 0 to 7, in the same way as the above description.

In the fifth embodiment, first, the number of transmissions of wireless frames transmitted to member stations during a given period is derived for each group ID (parenthesized portions in cells of the row of a group ID in FIG. 10). This can be obtained by measuring the number of group IDs output from the group-ID control unit 1-8 to the transmission signal generation unit 1-2 during the given period for each group ID.

The group-ID control unit 1-8 acquires, from the group ID monitor unit 1-9, group IDs that overlap with those of the adjacent access point Z. In the present embodiment, there are overlaps with respect to the group IDs 0, 1, 2, and 3. Moreover, there are two group IDs that are not used in the access point Y and are presumed to be also not used in the adjacent access point Z.

First, the group-ID control unit 1-8 allocates sets of stations corresponding to group IDs the number of which is equal to the number of group IDs that are not used in both the access point Y and the adjacent access point Z (two because the group IDs 5 and 6 are not used in the present embodiment) using, as the order of priorities, the order obtained by arranging the numbers of transmissions for group IDs in descending order. In the present embodiment, the order is the group ID 0, the group ID2, the group ID3, the group ID1, and the group ID4. Therefore, a set of stations of the group ID 0, i.e., the station-A, the station-B, the station-C, and the station-D, as well as a set of stations of the group ID 2, i.e., the station-B and station D, are allocated to the two vacant group IDs 5 and 6, respectively. FIG. 12 illustrates a group ID table updated by this operation.

Next, if overlapping group ID(s) still exist despite the above operation, group IDs the number of which is equal to the minimum overlaps that must be accepted, i.e., group IDs the number of which is equal to the result obtained by subtracting "B: the total number of available group IDs" from "A: the total sum of sets of stations corresponding to the group IDs that are being used in the access point Y and sets of stations corresponding to the group IDs that are being used in the adjacent access point Z, are overlapped.

In the embodiment, A is equal to nine in total because the access point Y uses five and the adjacent access point Z uses four, and B is equal to seven because the group IDs are defined as integers in a range from 0 to 7 and 7 is used for a single user.

Since A−B=9−7=2 holds, two group IDs are to be overlapped.

As a method for selecting sets of stations to be overlapped, sets of stations corresponding to group IDs having higher priorities are set in order as overlapping candidates based on the order obtained by arranging the sets of stations in ascending order using the number of transmissions as a parameter. That is, as can be seen from FIG. 10, in the present embodiment, the order is the group ID 4, the group ID 1, and the group ID 3. Moreover, two group IDs must be overlapped. Therefore, the group ID table is updated so that the station-D and the station-E of the group ID 4 as well as the station-A, the station-C, and the station-D of the group ID 1 are set as overlapping targets and overlaps can be avoided with respect to a set of stations corresponding to the remaining group ID 3. FIG. 13 is a diagram illustrating an example of a group ID table updated as described above.

As a result of the above change, the overlapping group IDs are the group IDs 1 and 3, and thus the number of overlapping group IDs can be reduced. Therefore, it is possible to maintain the power-saving effect in stations. Moreover, since two sets of stations having the smallest frequency of transmissions are allocated to the overlapping target group IDs, the frequency of occurrences of unnecessary reception operations by the stations belonging to the adjacent access point Z, which are caused by performing reception processes of wireless frames that use the group ID in the stations belonging to the adjacent access point Z, is reduced. Therefore, the overall power-saving effect is increased.

[Sixth Embodiment]

Next, a sixth embodiment of the wireless communication system will be described. The wireless communication system in the sixth embodiment has a functional configuration in which a configuration for performing a process related to group IDs of the adjacent access point Z is applied to the configuration of the fifth embodiment.

The fifth embodiment utilizes information indicating whether each group ID is used by the adjacent access point Z as information used for updating a group ID table. The sixth embodiment recognizes the number of transmissions of wireless frames transmitted to member stations during a given period for each group ID of the adjacent access point Z, and selects a set of stations allocated to a group ID to be overlapped. For example, the number of transmissions can be acquired by counting, in the access point Y and the stations 2-1 to 2-K, wireless frames transmitted from access points other than the access point Y for each group ID.

FIG. 14 is a diagram illustrating an example of group-ID environment information. Here, it is assumed that wireless frames transmitted from the adjacent access point Z to a set of stations of each group ID during a given period are those as shown in FIG. 14. In the present embodiment, the first-time group-ID reallocation operation as well as derivation of the number of group IDs to be overlapped and the operation of matching priorities of set of stations for which overlaps are accepted with the numbers of transmissions in ascending order in the second-time group-ID reallocation operation are the same as those described in the fifth embodiment.

In addition, in the sixth embodiment, the order of priorities assigned to group IDs to be overlapped is matched with the order of the numbers of transmissions of group IDs of the adjacent access point Z during a given period that are arranged in ascending order. That is, as can be seen from FIG. 14, arranging the group IDs based on the numbers of transmissions in ascending order results in the group ID 2, the group ID 0, the group ID 1, and the group ID 3. Moreover, as described previously, the order of the priorities assigned to group IDs to be overlapped for the sets of stations of the access point Y is (the station-D and the station-E), (the station-A, the station-C, and the station-D), and (the station-C, the station-E). Since it is necessary to set two group IDs to be overlapped, the station-D and the station-E are allocated to the group ID 2 and the station-A, the station-C, and the station-D are allocated to the group ID 0. FIG. 15 illustrates the result of the present operation. FIG. 15 is a diagram illustrating an example of an updated group ID table.

As a result of the above change, the overlapping group IDs are the group IDs 0 and 2, and thus the number of overlapping group IDs can be reduced. Therefore, it is possible to maintain the power-saving effect in stations. Moreover, since sets of stations having lower frequencies of transmissions are allocated to the overlapping target group IDs in order, the frequency of occurrences of unnecessary reception operations by the stations belonging to the adjacent access point Z, which are caused by performing reception processes of wireless frames that use the group ID in the stations belonging to the adjacent access point Z, is reduced, and thus the overall power-saving effect is increased.

Furthermore, since a list of stations that are allocated to the overlapping group IDs by the adjacent access point Z has the two smallest frequencies of transmissions among those of all the group IDs, it is possible to reduce the frequency of unnecessary reception operations in stations of the access point Y due to wireless frames transmitted from the adjacent access point Z

[Seventh Embodiment]

Next, a seventh embodiment of the wireless communication system will be described. The wireless communication system in the seventh embodiment has a functional configuration in which a group ID resetting method that is different from those of the third embodiment and the fifth embodiment is applied to the configuration of the first embodiment or the configuration of the second embodiment.

FIG. 16 is a diagram illustrating an example of a group ID table. FIG. 17 is a diagram illustrating an example of group-ID environment information. Here, it is assumed that a group ID table of the access point Y is that as shown in FIG. 16 and group-ID environment information when a group ID table of the access point Z has been detected using the configuration of the first embodiment or the configuration of the second embodiment is that as shown in FIG. 17. It is to be noted that numbers that can be used as group IDs are eight integers from 0 to 7, in the same way as the above embodiments.

First, the group-ID control unit 1-8 acquires, for all the stations, information indicating whether each station is operating with a battery from belonging information of each station. The group-ID control unit 1-8 determines whether a battery-operated station is included in each group ID from the acquired result. In the example of FIG. 16, since the station-A and the station B are battery-operated stations, the group IDs 0, 1, and 2 fulfill the requirement.

The group-ID control unit 1-8 acquires, from the group ID monitor unit 1-9, group IDs that overlap with those of the adjacent access point Z. In the present embodiment, there are overlaps with respect to the group IDs 0, 1, 2, and 3. Moreover, there are two group IDs that are not used in the access point Y and are presumed to be also not used in the adjacent access point Z.

The group-ID control unit 1-8 groups sets of stations corresponding to group IDs the number of which is equal to the number of group IDs that are not used in both the access point Y and the adjacent access point Z (two because the group IDs 5 and 6 are not used in the present embodiment) based on whether a battery-operated station is included. In the present embodiment, the group IDs 0, 1, and 2 each include battery-operated station(s) and the group IDs 3 and 4 include no battery-operated station. In order to preferentially avoid overlaps of group IDs for battery-operated stations, a set of stations of the group ID 0, i.e., the station-A, the station-B, the station-C, and the station-D, as well as a set of stations of the group ID 1, i.e., the station-A, the station-C, and the station-D, are allocated to the two vacant group IDs 5 and 6, respectively. FIG. 18 illustrates a group ID table updated by this operation. FIG. 18 is a diagram illustrating an example of an updated group ID table.

Next, if overlapping group ID(s) still exist despite the above operation, group IDs the number of which is equal to the minimum number of overlaps that must be accepted, i.e., group IDs the number of which is equal to the result obtained by subtracting "B: the total number of available group IDs" from "A: the total sum of sets of stations corresponding to the group IDs that are being used in the access point Y and sets of stations corresponding to the group IDs that are being used in the adjacent access point Z, are overlapped.

In the present embodiment, A is equal to nine in total because the access point Y uses five and the adjacent access point Z uses four, and B is equal to seven because the group IDs are defined as integers in a range from 0 to 7 and 7 is used for a single user.

Since A−B=9−7=2 holds, two group IDs are to be overlapped.

As a method for selecting sets of stations to be overlapped, sets of stations corresponding to group IDs that include no battery-operated station are preferentially set as overlapping candidates. That is, as can be seen from FIG. 18, in the present embodiment, the group IDs 3 and 4 are preferentially set as overlapping candidates, and the group ID 4, for which there is no overlap with the adjacent access point Z, is allocated to a set of stations of the group ID 2, which includes a battery-operated station, i.e., the station-B and the station-D.

FIG. 19 is a diagram illustrating an example of an updated group ID table. The updated group ID table is that as shown in FIG. 19.

As a result of the above change, the overlapping group IDs are the group IDs 2 and 3, and the number of overlapping group IDs is reduced, so that it is possible to maintain the power-saving effect in stations. Moreover, since a group ID for which there is no overlap with the adjacent access point Z is preferentially allocated to a set of stations that includes battery-operated station(s), it is possible to achieve control which makes a reduction in the power-saving effect in the battery-operated station(s) as small as possible.

It is to be noted that although embodiments in which a single adjacent access point Z is present has been described above, a case in which two or more adjacent access points Z are present can be dealt with by performing an operation of avoiding overlaps for group IDs used in one or more adjacent access points Z.

[Management Frames]

Meanwhile, although encryption is normally used for enhancing the security of data signals, the IEEE 802.11 extends target wireless frames to be encrypted in order to enhance the security of management frames such as a beacon and an authentication frame. Moreover, in the IEEE 802.11ac, when an access point notifies stations of group IDs, each station is notified of a group ID individually using a unicast communication. Here, as means for allowing for the access point Y in each of the above-described embodiments to acquire a group ID used by the adjacent access point Z, there is a method in which the access point Y receives a management frame with which the adjacent access point Z notifies a station connecting to the adjacent access point Z of the group ID. However, if the management frame is encrypted by the access point Z, the access point Y cannot acquire its content.

Figure 20:
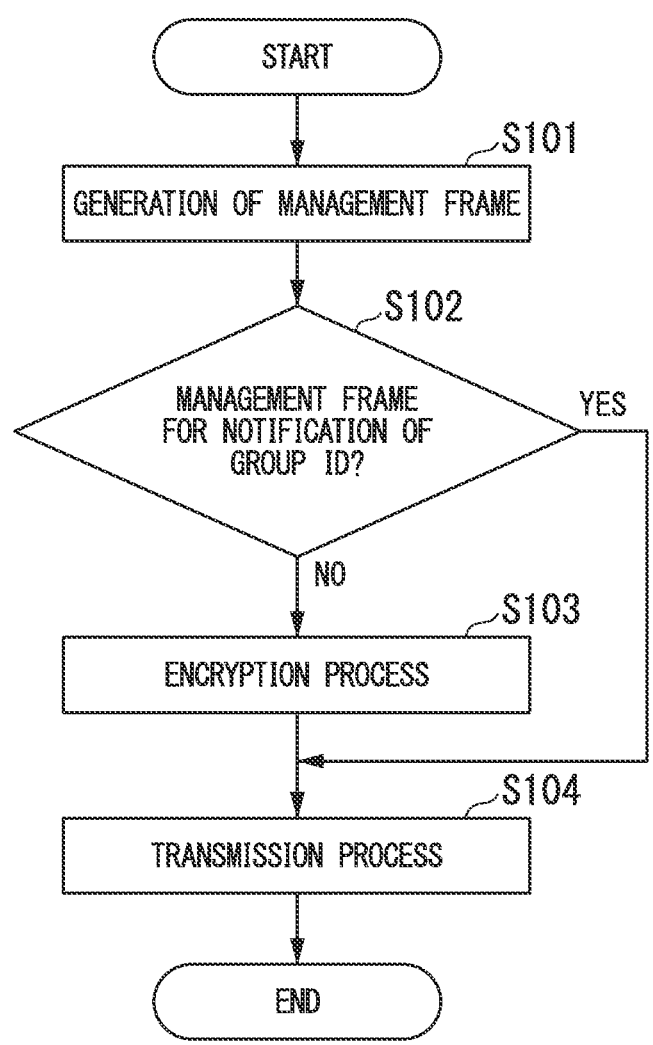
FIG. 20 is a flowchart showing an operation of an access point.

Thus, a method for transmitting a management frame in order for one of access points to acquire a group ID used by another access point will be described. FIG. 20 is a flowchart showing an operation of the access point Y. The access point Y generates a management frame (step S101) and determines whether this management frame is a management frame for notifying a station connecting to the access point Y of a group ID corresponding to the station (step S102). If the management frame is not a management frame for notifying the station connecting to the access point Y itself of the group ID (step S102-NO), the access point Y performs encryption and transmission (steps S103 and S104). In contrast, if the management frame is a management frame for notifying the station connecting to the access point Y itself of the group ID (step S102-YES), the access point Y performs transmission without performing encryption (step S104). In this way, with the configuration which does not perform encryption for a management frame used for notification of a group ID, it is possible for the adjacent access point Z to acquire the content of the management frame used for notification of the group ID. That is, if the adjacent access point Z is configured in this way, the access point Y can acquire the content of a management frame transmitted from the access point Z.

Although embodiments of the present invention have been described above in detail with reference to the drawings, the specific configuration is not restricted to these embodiments, and design and so on that do not depart from the gist of the present invention are also included.

INDUSTRIAL APPLICABILITY

The present invention is applicable to, for example, wireless communication systems in which an access point apparatus performs simultaneous transmission to a plurality of station apparatuses. The present invention detects overlaps of group IDs between a plurality of communication cells and reduces the overlaps, thereby making it possible to avoid an increase in the consumed power in stations.

DESCRIPTION OF REFERENCE SIGNS

A to I, 2-1 to 2-K . . . station (station apparatus)
Y, Z, 1 . . . access point (access point apparatus)
1-1 . . . data selection/output unit
1-2 . . . transmission signal generation unit
1-3 . . . wireless signal transmission/reception unit
1-4-1 to 1-4-N . . . transmission/reception antenna
1-5 . . . reception signal demodulation unit
1-6 channel information generation unit
1-7 . . . group-ID table storage unit
1-8 . . . group-ID control unit
1-9 . . . group-ID monitor unit
2-1-1-1 to 2-1-1-M1 . . . transmission/reception antenna
2-1-2 . . . wireless signal transmission/reception unit
2-1-3 . . . reception signal demodulation unit
2-1-4 . . . transmission signal generation unit
2-1-5 . . . group-ID determination unit
2-1-6 . . . group-ID list storage unit
2-1-7 . . . group-ID environment notification unit
2-K-1-1 to 2-K-1-MK . . . transmission/reception antenna
2-K-2 . . . wireless signal transmission/reception unit
2-K-3 . . . reception signal demodulation unit
2-K-4 . . . transmission signal generation unit
2-K-5 . . . group-ID determination unit 2-K-6 . . . group-ID list storage unit
2-K-7 . . . group-ID environment notification unit

The invention claimed is:

1. A wireless communication system in which an access point apparatus performs simultaneous transmission to a plurality of station apparatuses, the access point apparatus comprising:
a group storage unit which stores an association between a station apparatus included in a group that is a target for the simultaneous transmission and group identification information;
a group identification information notification unit which notifies each station apparatus included in the group of the group identification information;
an identification information acquisition unit which acquires group identification information that is being used by a second access point apparatus; and
an identification information change unit which, if group identification information that is being used by the access point apparatus itself overlaps with the group identification information that is being used by the second access point apparatus, changes the group identification information so as to reduce the number of pieces of overlapping group identification information, the station apparatuses each comprising a notification unit which receives a signal including group identification information that corresponds to each station apparatus itself, and, if a predetermined condition indicating that the signal is not destined for each station apparatus itself is satisfied, notifies the access point apparatus which is a party with which each station apparatus itself performs wireless communication of the fact that there is an overlap with respect to the group identification information of the signal that satisfies the predetermined condition, wherein if the sum of the number of pieces of group identification information that are being used by the access point apparatus itself and the number of pieces of group identification information that are being used by the second access point apparatus is larger than the total number of pieces of group identification information that are available to the access point apparatus itself, the identification information change unit calculates the total amount of traffic for each of the pieces of the group identification information that are being used by the access point apparatus itself and preferentially changes group identification information of a group that has the total amount of the traffic which is larger than those of the other groups to group identification information that is not used by the second access point apparatus.

2. A wireless communication system in which an access point apparatus performs simultaneous transmission to a plurality of station apparatuses, the access point apparatus comprising:
a group storage unit which stores an association between a station apparatus included in a group that is a target for the simultaneous transmission and group identification information;
a group identification information notification unit which notifies each station apparatus included in the group of the group identification information;
an identification information acquisition unit which acquires group identification information that is being used by a second access point apparatus; and
an identification information change unit which, if group identification information that is being used by the access point apparatus itself overlaps with the group identification information that is being used by the second access point apparatus, changes the group identification information so as to reduce the number of pieces of overlapping group identification information, the station apparatuses each comprising a notification unit which receives a signal including group identification information that corresponds to each station apparatus itself, and, if a predetermined condition indicating that the signal is not destined for each station apparatus itself is satisfied, notifies the access point apparatus which is a party with which each station apparatus itself performs wireless communication of the fact that there is an overlap with respect to the group identification information of the signal that satisfies the predetermined condition, wherein if the sum of the number of pieces of group identification information that are being used by the access point apparatus itself and the number of pieces of group identification information that are being used by the second access point apparatus is larger than the total number of pieces of group identification information that are available to the access point apparatus itself, the identification information change unit acquires the number of transmissions of wireless frames destined for the station apparatus corresponding to the group identification information during a given past period for each of the pieces of the group identification information that are being used by the access point apparatus itself and preferentially changes group identification information of a group having the number of transmissions which is larger than those of the other groups to group identification information that is not used by the second access point apparatus.

3. A wireless communication system in which an access point apparatus performs simultaneous transmission to a plurality of station apparatuses, the access point apparatus comprising:
a group storage unit which stores an association between a station apparatus included in a group that is a target for the simultaneous transmission and group identification information;
a group identification information notification unit which notifies each station apparatus included in the group of the group identification information;
an identification information acquisition unit which acquires group identification information that is being used by a second access point apparatus; and
an identification information change unit which, if group identification information that is being used by the access point apparatus itself overlaps with the group identification information that is being used by the second access point apparatus, changes the group identification information so as to reduce the number of pieces of overlapping group identification information, the station apparatuses each comprising a notification unit which receives a signal including group identification information that corresponds to each station apparatus itself, and, if a predetermined condition indicating that the signal is not destined for each station apparatus itself is satisfied, notifies the access point apparatus which is a party with which each station apparatus itself performs wireless communication of the fact that there is an overlap with respect to the group identification information of the signal that satisfies the predetermined condition, wherein if the sum of the number of pieces of group identification information that are being used by the access point apparatus itself and the number of pieces of group identification information that are being used by the second access point apparatus is larger than the total number of pieces of group identification information that are available to the access point apparatus itself, the identification information change unit preferentially changes group identification information of a group which includes a battery-powered station apparatus to group identification information that is not used by the second access point apparatus.

4. An access point apparatus in a wireless communication system in which the access point apparatus performs simultaneous transmission to a plurality of station apparatuses, the access point apparatus comprising:
  a group storage unit which stores an association between a station apparatus included in a group that is a target for the simultaneously transmission and group identification information;
  a group identification information notification unit which notifies each station apparatus included in the group of the group identification information;
  an identification information acquisition unit which acquires group identification information that is being used by a second access point apparatus; and
  an identification information change unit which, if group identification information that is being used by the access point apparatus itself overlaps with the group identification information that is being used by the second access point apparatus, changes the group identification information so as to reduce the number of pieces of overlapping group identification information,
  wherein if the sum of the number of pieces of group identification information that are being used by the access point apparatus itself and the number of pieces of group identification information that are being used by the second access point apparatus is larger than the total number of pieces of group identification information that are available to the access point apparatus itself, the identification information change unit calculates the total amount of traffic for each of the pieces of the group identification information that are being used by the access point apparatus itself and preferentially changes group identification information of a group that has the total amount of the traffic which is larger than those of the other groups to group identification information that is not used by the second access point apparatus.

5. The access point apparatus according to claim 4, wherein the identification information acquisition unit receives group identification information informed by the second access point apparatus to acquire the group identification information that is being used by the second access point apparatus.

6. The access point apparatus according to claim 4, wherein the identification information acquisition unit receives and acquires group identification information informed by the second access point apparatus from the station apparatus.

7. The access point apparatus according to claim 4, wherein the identification information change unit preferentially changes group identification information of a group that has the total amount of traffic which is smaller than those of the other groups to the group identification information that is being used by the second access point apparatus.

8. An access point apparatus in a wireless communication system in which the access point apparatus performs simultaneous transmission to a plurality of station apparatuses, the access point apparatus comprising:
  a group storage unit which stores an association between a station apparatus included in a group that is a target for the simultaneously transmission and group identification information;
  a group identification information notification unit which notifies each station apparatus included in the group of the group identification information;
  an identification information acquisition unit which acquires group identification information that is being used by a second access point apparatus; and
  an identification information change unit which, if group identification information that is being used by the access point apparatus itself overlaps with the group identification information that is being used by the second access point apparatus, changes the group identification information so as to reduce the number of pieces of overlapping group identification information,
  wherein if the sum of the number of pieces of group identification information that are being used by the access point apparatus itself and the number of pieces of group identification information that are being used by the second access point apparatus is larger than the total number of pieces of group identification information that are available to the access point apparatus itself, the identification information change unit acquires the number of transmissions of wireless frames destined for the station apparatus corresponding to the group identification information during a given past period for each of the pieces of the group identification information that are being used by the access point apparatus itself and preferentially changes group identification information of a group having the number of transmissions which is larger than those of the other groups to group identification information that is not used by the second access point apparatus.

9. The access point apparatus according to claim 8, wherein the identification information acquisition unit receives group identification information informed by the second access point apparatus to acquire the group identification information that is being used by the second access point apparatus.

10. The access point apparatus according to claim 8, wherein the identification information acquisition unit receives and acquires group identification information informed by the second access point apparatus from the station apparatus.

11. The access point apparatus according to claim 8, wherein the identification information change unit preferentially changes group identification information of a group having a smaller number of transmissions than those of the other groups to the group identification information that is being used by the second access point apparatus.

12. An access point apparatus in a wireless communication system in which the access point apparatus performs simultaneous transmission to a plurality of station apparatuses, the access point apparatus comprising:
  a group storage unit which stores an association between a station apparatus included in a group that is a target for the simultaneously transmission and group identification information;
  a group identification information notification unit which notifies each station apparatus included in the group of the group identification information;
  an identification information acquisition unit which acquires group identification information that is being used by a second access point apparatus; and
  an identification information change unit which, if group identification information that is being used by the access point apparatus itself overlaps with the group identification information that is being used by the second access point apparatus, changes the group identification information so as to reduce the number of pieces of overlapping group identification information, wherein if the sum of the number of pieces of group identification information that are being used by the access point apparatus itself and the number of pieces of group identification information that are being used by the second access point apparatus is larger than the total number of pieces of group identification information that are available to the access point apparatus itself, the identification information change unit preferentially changes group identification information of a group which includes a battery-powered station apparatus to group identification information that is not used by the second access point apparatus.

13. The access point apparatus according to claim 12, wherein the identification information acquisition unit receives group identification information informed by the second access point apparatus to acquire the group identification information that is being used by the second access point apparatus.

14. The access point apparatus according to claim 12, wherein the identification information acquisition unit receives and acquires group identification information informed by the second access point apparatus from the station apparatus.

* * * * *